(12) United States Patent
Cao

(10) Patent No.: US 11,568,582 B2
(45) Date of Patent: Jan. 31, 2023

(54) SYSTEM AND METHOD FOR RECONSTRUCTING AN IMAGE

(71) Applicant: SHANGHAI UNITED IMAGING HEALTHCARE CO., LTD., Shanghai (CN)

(72) Inventor: Wenjing Cao, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 206 days.

(21) Appl. No.: 17/141,245

(22) Filed: Jan. 5, 2021

(65) Prior Publication Data

US 2021/0125383 A1 Apr. 29, 2021

Related U.S. Application Data

(63) Continuation of application No. 15/721,044, filed on Sep. 29, 2017, now Pat. No. 10,896,526, which is a
(Continued)

(51) Int. Cl.
*G06K 9/00* (2022.01)
*G06T 11/00* (2006.01)

(52) U.S. Cl.
CPC .......... *G06T 11/005* (2013.01); *G06T 11/006* (2013.01); *G06T 2210/41* (2013.01); *G06T 2211/412* (2013.01); *G06T 2211/424* (2013.01)

(58) Field of Classification Search
None
See application file for complete search history.

(56) References Cited

U.S. PATENT DOCUMENTS

| 5,390,112 A * | 2/1995 | Tam ...................... A61B 6/032 378/17 |
| 6,169,817 B1 * | 1/2001 | Parker .................... G06T 7/215 345/419 |

(Continued)

FOREIGN PATENT DOCUMENTS

| CN | 104574459 A | 4/2015 |
| CN | 106683144 A | 5/2017 |
| CN | 106683146 A | 5/2017 |

OTHER PUBLICATIONS

International Search Report in PCT/CN2017/098025 dated May 23, 2018, 5 pages.
(Continued)

*Primary Examiner* — Avinash Yentrapati
(74) *Attorney, Agent, or Firm* — Metis IP LLC

(57) ABSTRACT

The present disclosure relates to methods, systems, and non-transitory computer readable mediums for reconstructing an image. Image data may be obtained, wherein the image data may be generated by a detector array. A weighting window may be determined based on at least one parameter relating to the detector array. A first set of data may be determined based on the image data and the weighting window. An objective function associated with a target image may be determined based on the first set of data, wherein the objective function may include a first model, the first model may represent a difference between the target image and the first set of data, and the first model may be identified based on the first set of data. The target image may be reconstructed by performing a plurality of iterations based on the objective function.

20 Claims, 19 Drawing Sheets

Related U.S. Application Data continuation of application No. PCT/CN2017/098025, filed on Aug. 18, 2017.

(56) References Cited

U.S. PATENT DOCUMENTS

| | | | |
|---|---|---|---|
| 6,522,714 B1* | 2/2003 | Wang | A61B 6/027 378/19 |
| 10,339,634 B2 | 7/2019 | Wang et al. | |
| 2003/0208117 A1* | 11/2003 | Shwartz | G01T 1/1644 600/407 |
| 2004/0076265 A1* | 4/2004 | Heuscher | A61B 6/4085 378/210 |
| 2006/0067457 A1* | 3/2006 | Zamyatin | A61B 6/027 378/4 |
| 2006/0140335 A1 | 6/2006 | Heuscher et al. | |
| 2007/0217666 A1* | 9/2007 | Gal | A61B 6/4258 382/131 |
| 2009/0161933 A1* | 6/2009 | Chen | A61B 6/037 382/131 |
| 2009/0207964 A1* | 8/2009 | Pack | G01N 23/046 378/4 |
| 2009/0225932 A1* | 9/2009 | Zhu | G06T 11/005 378/98.12 |
| 2010/0046819 A1* | 2/2010 | Noo | A61B 6/027 378/4 |
| 2011/0052021 A1* | 3/2011 | Noo | G06T 11/006 382/131 |
| 2011/0150305 A1* | 6/2011 | Zeng | G06T 11/005 382/131 |
| 2012/0250821 A1* | 10/2012 | Koehler | A61B 6/469 378/16 |
| 2012/0294414 A1* | 11/2012 | Koehler | A61B 6/032 378/147 |
| 2013/0094735 A1* | 4/2013 | Zamyatin | G06T 11/005 382/131 |
| 2014/0029819 A1* | 1/2014 | Zeng | G06T 11/006 382/131 |
| 2014/0205171 A1 | 7/2014 | Zeng et al. | |
| 2015/0086097 A1* | 3/2015 | Chen | G06T 11/006 382/131 |
| 2015/0332486 A1* | 11/2015 | Zhang | G06T 11/006 378/19 |
| 2017/0154444 A1* | 6/2017 | Kobayashi | G06T 11/003 |
| 2017/0178366 A1* | 6/2017 | Wang | G06T 11/006 |
| 2017/0294034 A1* | 10/2017 | Zhou | G06T 7/0012 |
| 2017/0301066 A1* | 10/2017 | Wang | G06T 11/008 |
| 2017/0365075 A1* | 12/2017 | Meganck | G06T 7/0012 |
| 2018/0204305 A1* | 7/2018 | Wang | G06T 5/002 |
| 2019/0206095 A1* | 7/2019 | Xing | G06N 3/084 |

OTHER PUBLICATIONS

Written Opinion in PCT/CN2017/098025 dated May 23, 2018, 5 pages.

First Office Action in Chinese Application No. 201810460732.7 dated Jun. 19, 2019, 18 pages.

* cited by examiner

SYSTEM AND METHOD FOR RECONSTRUCTING AN IMAGE

CROSS-REFERENCE TO RELATED APPLICATIONS

This application is a continuation of U.S. patent application Ser. No. 15/721,044, filed on Sep. 29, 2017, which in turn is a continuation of International Application No. PCT/CN2017/098025, filed on Aug. 18, 2017, the contents of which are incorporated herein by reference in their entirety.

TECHNICAL FIELD

The present disclosure generally relates to image reconstruction, and more particularly, a system and method for iterative reconstruction based on computed tomography image data.

BACKGROUND

Computed tomography (CT) makes use of computer-processed combinations of X-ray images taken from various angles to produce cross-sectional images. Iterative reconstruction techniques are widely used in CT image reconstruction. A motion of an object during scanning may cause motion artifacts and/or noise in a CT image reconstructed using an iterative reconstruction technique. Thus, it is desirable to provide systems and methods for reducing or removing motion artifacts and/or noise in image reconstruction.

SUMMARY

One aspect of the present disclosure relates to a first method for reconstructing an image. The method may be implemented on a computing device having at least one processor, at least one computer-readable storage medium, and a communication port connected to an imaging device. The imaging device may include a detector array. The detector array may include a plurality of rows of detector units, wherein the detector units may be arranged in a row direction and a channel direction. The method may include one or more of the following operations. Image data may be obtained, wherein the image data may be generated by the detector array. A weighting window may be determined based on at least one parameter relating to the detector array. A first set of data may be determined based on the image data and the weighting window. An objective function associated with a target image may be determined based on the first set of data, wherein the objective function may include a first model, the first model may represent a difference between the target image and the first set of data, and the first model may be identified based on the first set of data. The target image may be reconstructed by performing a plurality of iterations based on the objective function.

Another aspect of the present disclosure relates to a first non-transitory computer readable medium embodying a computer program product. The computer program product may include instructions configured to cause a computing device to effectuate the first method.

A further aspect of the present disclosure relates to a first system for reconstructing an image. The system may include at least one non-transitory computer-readable storage medium including a set of instructions, and at least one processor in communication with the at least one non-transitory computer-readable storage medium, wherein when executing the instructions, the at least one processor is configured to cause the system to effectuate the first method.

A further aspect of the present disclosure relates to a second method for reconstructing an image. The method may be implemented on a computing device having at least one processor, at least one computer-readable storage medium, and a communication port connected to an imaging device. The method may include one or more of the following operations. Image data generated by the imaging device may be obtained. An objective function associated with a target image may be determined based on the image data, wherein the objective function may include a first model and a regularization item for denoising the image data, the first model may represent a difference between the target image and the image data, and the regularization item may include a second model for adjusting an intensity of denoising the image data. The target image may be reconstructed by performing a plurality of iterations based on the objective function.

A further aspect of the present disclosure relates to a second non-transitory computer readable medium embodying a computer program product. The computer program product may include instructions configured to cause a computing device to effectuate the second method.

A further aspect of the present disclosure relates to a second system for reconstructing an image. The system may include at least one non-transitory computer-readable storage medium including a set of instructions, and at least one processor in communication with the at least one non-transitory computer-readable storage medium, wherein when executing the instructions, the at least one processor is configured to cause the system to effectuate the second method.

In some embodiments, the determination of the first set of data based on the image data and the weighting window may include one or more of the following operations. The first set of data may be determined based on a dot product between a matrix of the image data and the weighting window, wherein the matrix of the image data may include a plurality of subsets of image data.

In some embodiments, the determination of the first set of data based on the image data and the weighting window may include one or more of the following operations. A weighting matrix including a plurality of weighting factors may be determined. The first set of data may be determined based on the image data, the weighting window, and the weighting matrix.

In some embodiments, the plurality of weighting factors of the weight matrix may be within a range from 0 to 1.

In some embodiments, the first method may further include one or more of the following operations. The plurality of weighting factors of the weight matrix may be determined based on a parameter associated with the detector array, wherein the parameter may include a position of one detector unit in the row direction.

In some embodiments, the determination of the plurality of weighting factors may include one or more of the following operations. A first parameter and a second parameter may be applied, wherein the first parameter may define a first range of the position of a detector unit in the row direction corresponding to a first set of weighting factors equal to 1, and the second parameter may define a second range of the position of a detector unit in the row direction corresponding to a second set of weighting factors greater than or equal to 0 and less than 1.

In some embodiments, the first parameter may be a constant value in a range from 0 to 10.

In some embodiments, the second parameter may be a constant value in a range from 0 to 10.

In some embodiments, the objective function may further include a regularization item for denoising the image data, and the determination of the objective function associated with a target image based on the first set of data may include one or more of the following operations. The regularization item for denoising the image data may be determined based on a second model. The objective function may be determined based on the first model and the regularization item.

In some embodiments, the determination of the objective function associated with a target image based on the first set of data may further include one or more of the following operations. The second model may be determined based on the weighting matrix, wherein the second model may relate to an intensity of denoising an image estimate generated in at least one of the plurality of iterations.

In some embodiments, the objective function may be a sum of the first model and the regularization item.

In some embodiments, the first method may further include one or more of the following operations. A constraint associated with the objective function for determining a target value of the objective function may be determined, wherein the target value may correspond to the target image.

In some embodiments, the first method may further include one or more of the following operations. The image data may be pre-processed, wherein pre-processing of the image data may include one or more of the following operations. The image data may be denoised based on a third model, and wherein the third model may be generated based on a noise statistical model.

In some embodiments, the at least one parameter relating to the detector array may include a first number of the detector units in the row direction, a second number of the detector units in the channel direction, a pitch, and/or an angle of one of the detector units with respect to the channel direction.

In some embodiments, the second method may further include one or more of the following operations. A weighting matrix relating to the image data may be determined.

In some embodiments, the second model may be determined based on the weighting matrix.

In some embodiments, the second model may be further determined based on a square of a back-projection of the image data weighted by the weighting matrix.

In some embodiments, the objective function may be a sum of the first model and the regularization item.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
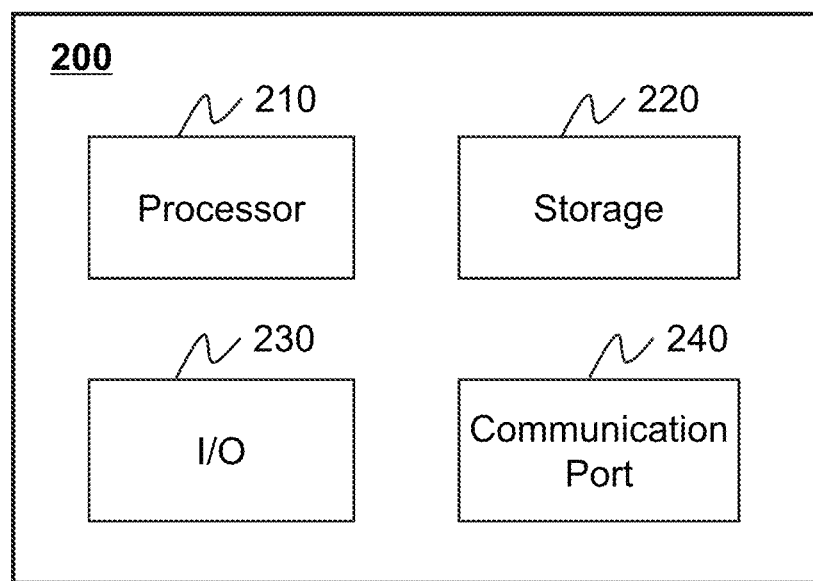
FIG. 2 is a schematic diagram illustrating exemplary hardware and/or software components of an exemplary computing device on which the processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

For illustration purposes, the following description is provided to help better understanding an imaging process. It is understood that this is not intended to limit the scope of the present disclosure. For persons having ordinary skills in the art, a certain amount of variations, changes and/or modifications may be deducted under guidance of the present disclosure. Those variations, changes and/or modifications do not depart from the scope of the present disclosure.

Figure 1:
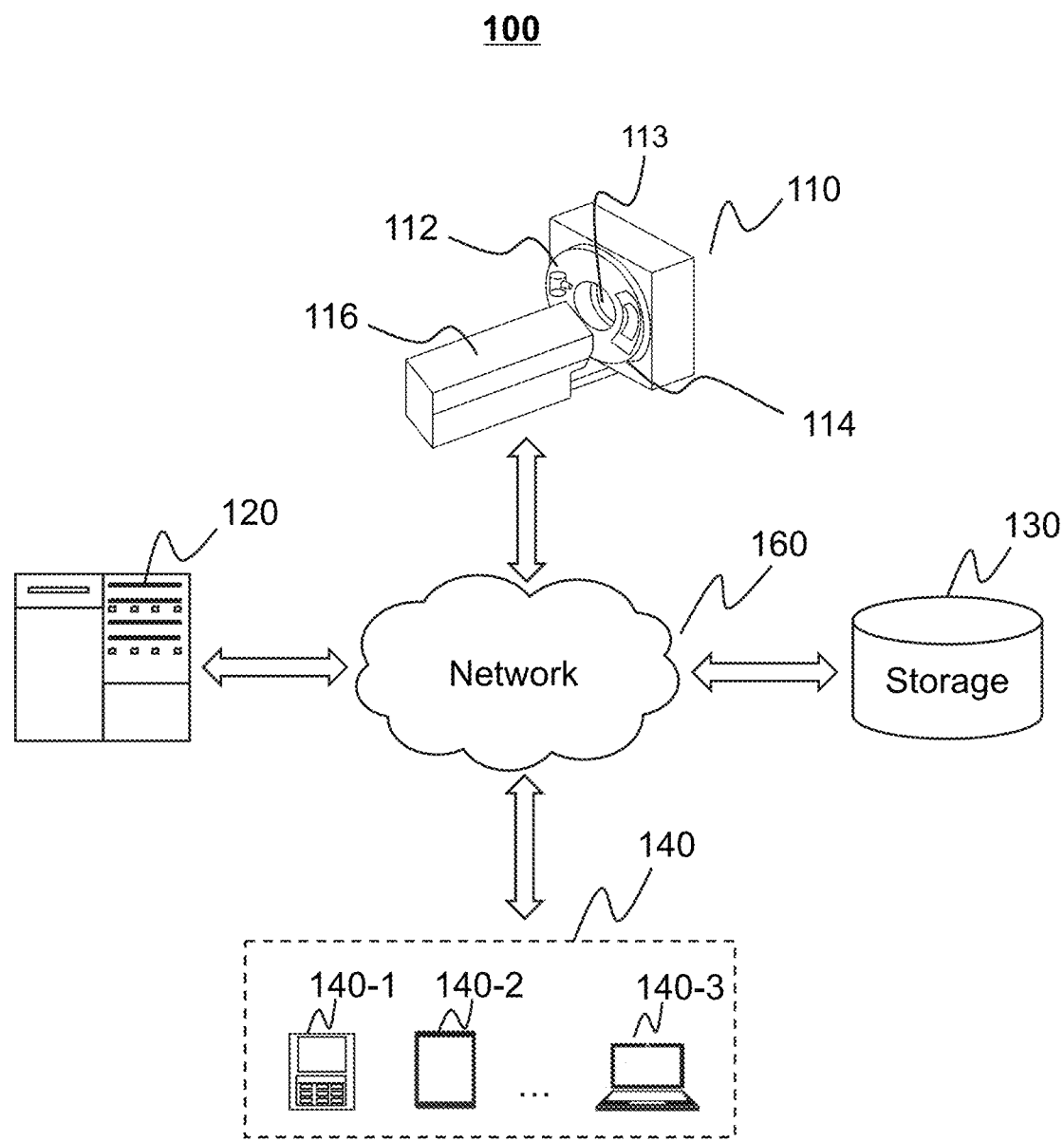
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown, the imaging system 100 may include a scanner 110, a processing engine 120, a storage 130, one or more terminals 140, and a network 160. In some embodiments, the scanner 110, the processing engine 120, the storage 130, and/or the terminal(s) 140 may be connected to and/or communicate with each other via a wireless connection (e.g., the network 160), a wired connection, or a combination thereof. The connection between the components in the imaging system 100 may be variable. Merely by way of example, the scanner 110 may be connected to the processing engine 120 through the network 160, as illustrated in FIG. 1. As another example, the scanner 110 may be connected to the processing engine 120 directly. As a further example, the storage 130 may be connected to the processing engine 120 through the network 160, as illustrated in FIG. 1, or connected to the processing engine 120 directly.

The scanner 110 may generate or provide image data via scanning a subject, or a part of the subject. The scanner 10 may include a single-modality scanner and/or multi-modality scanner. The single-modality may include, for example, a computed tomography (CT) scanner. In some embodiments, the CT scanner may be a spiral CT scanner. The multi-modality scanner may include a single photon emission computed tomography-computed tomography (SPECT-CT) scanner, a positron emission tomography-computed tomography (CT-PET) scanner, a computed tomography-ultra-sonic (CT-US) scanner, a digital subtraction angiography-computed tomography (DSA-CT) scanner, or the like, or a combination thereof. In some embodiments, the subject may include a body, a substance, an object, or the like, or a combination thereof. In some embodiments, the subject may include a specific portion of a body, such as a head, a thorax, an abdomen, or the like, or a combination thereof. In some embodiments, the subject may include a specific organ, such as an esophagus, a trachea, a bronchus, a stomach, a gallbladder, a small intestine, a colon, a bladder, a ureter, a uterus, a fallopian tube, etc.

In some embodiments, the scanner 110 may transmit the image data via the network 160 to the processing engine 120, the storage 130, and/or the terminal(s) 140. For example, the image data may be sent to the processing engine 120 for further processing, or may be stored in the storage 130.

In some embodiments, the scanner 110 may include a tube 112, a detector array 114, a detecting region 113, and a table 116. The tube 112 may generate and/or emit one or more radiation beams travelling toward the subject located on the table 116. In some embodiments, the tube 112 may include a cold cathode ion tube, a high vacuum hot cathode tube, a rotating anode tube, etc. The radiation beams may include a particle ray, a photon ray, or the like, or a combination thereof. The radiation beams may have the shape of a line, a narrow pencil, a narrow fan, a fan, a cone, a wedge, an irregular shape, or the like, or a combination thereof. In some embodiments, the scanner 110 may include one or more collimators. The collimator(s) may include a device that narrows the radiation beam(s) to a width (also referred to as a width of collimation) to cause the radiation beam(s) to become more aligned in a specific direction.

The detector array 114 may detect one or more radiation beams emitted from the tube 112. In some embodiments, the detector array 114 may include one or more rows of detector units. One row may include a plurality of detector units (also referred to as channels). Thus, the detector array 114 may have a plurality of detector units arranged in a row direction and a channel direction along an annular inner wall of the detecting region 113. As used herein, the row direction may be parallel to a central axis of the detecting region 113 (e.g., a direction along which the table 116 may enter into the detecting region 113). The channel direction may be perpendicular to the row direction in a three-dimensional space of the detecting region 113. For example, the channel direction may be the circular direction of the annular inner wall of the detecting region 113. Thus, if one or more detector arrays 114 are disposed on a two-dimensional plane, the row direction and the channel direction may be regarded as directions of two coordinate axes in the two-dimensional plane (see FIGS. 11A-11C). The detector array 114 may have any suitable shape. For example, the detector array 114 may have the shape of an arc, a circle, a rectangle, or the like, or a combination thereof.

A detector unit may refer to a minimum individual component in the detector array 114 that may detect a radiation signal. For example, a detector unit may include a scintillator layer and a photodiode. The scintillator layer may absorb radiation beams and emit a visible light. The photodiode may detect the emitted visible light. The photodiode may convert the visible light into an electrical signal. In some embodiments, the detected radiation beams may be directly converted into an electrical signal by a suitable direct conversion material, such as amorphous selenium. An analog/digital converter in the scanner 110 may convert the electrical signal into digital signal(s) (also referred to as image data, e.g., projection data). In some embodiments, the number of rows of detector units in a detector array 114 may be, for example, 4, 8, 16, 24, 32, 34, 64, 128, 320, or more than 320. For instance, the number of detector units in one row may be in a range from 0 to 1000, or greater than 1000.

In some embodiments, when the tube 112 emits a plurality of radiation beams traversing the subject, the detector array 114 may detect the traversed radiation beams and generate raw data (e.g., projection data) related to the subject. A detector unit in the detector array 114 may detect one or more radiation beams and generate a subset of the raw data. In some embodiments, an image corresponding to a slice of the subject may be reconstructed based on raw data generated by just one row of detector units. In some embodiments, an image corresponding to a slice of the subject may be reconstructed based on raw data generated by more than one row of detector units.

The processing engine 120 may process data and/or information obtained from the scanner 110, the storage 130, and/or the terminal(s) 140. For example, the processing engine 120 may reconstruct an image based on projection data collected by the scanner 110. In some embodiments, the processing engine 120 may be a single server or a server group. The server group may be centralized or distributed. In some embodiments, the processing engine 120 may be local or remote. For example, the processing engine 120 may access information and/or data from the scanner 110, the storage 130, and/or the terminal(s) 140 via the network 160. As another example, the processing engine 120 may be directly connected to the scanner 110, the terminal(s) 140, and/or the storage 130 to access information and/or data. In some embodiments, the processing engine 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing engine 120 may be implemented by a computing device 200 having one or more components as described in connection with FIG. 2.

The storage 130 may store data, instructions, and/or any other information. In some embodiments, the storage 130 may store data obtained from the processing engine 120, the terminal(s) 140, and/or the interaction device 150. In some embodiments, the storage 130 may store data and/or instructions that the processing engine 120 may execute or use to perform exemplary methods described in the present disclosure. In some embodiments, the storage 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 130 may be implemented on a cloud platform as described elsewhere in the disclosure.

In some embodiments, the storage 130 may be connected to the network 160 to communicate with one or more other components in the imaging system 100 (e.g., the processing engine 120, the terminal(s) 140, etc.). One or more components in the imaging system 100 may access the data or instructions stored in the storage 130 via the network 160. In some embodiments, the storage 130 may be part of the processing engine 120.

The terminal(s) 140 may be connected to and/or communicate with the scanner 110, the processing engine 120, and/or the storage 130. For example, the terminal(s) 140 may obtain a processed image from the processing engine 120. As another example, the terminal(s) 140 may obtain image data acquired via the scanner 110 and transmit the image data to the processing engine 130 to be processed. In some embodiments, the terminal(s) 140 may include a mobile device 140-1, a tablet computer 140-2, a laptop computer 140-3, or the like, or any combination thereof. For example, the mobile device 140-1 may include a mobile phone, a personal digital assistance (PDA), a gaming device, a navigation device, a point of sale (POS) device, a laptop, a tablet computer, a desktop, or the like, or any combination thereof. In some embodiments, the terminal(s) 140 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing engine 120.

The network 160 may include any suitable network that can facilitate exchange of information and/or data for the imaging system 100. In some embodiments, one or more components of the imaging system 100 (e.g., the scanner 110, the processing engine 120, the storage 130, the terminal(s) 140, etc.) may communicate information and/or data with one or more other components of the imaging system 100 via the network 160. For example, the processing engine 120 may obtain image data from the scanner 110 via the network 160. As another example, the processing engine 120 may obtain user instruction(s) from the terminal (s) 140 via the network 160. The network 160 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 160 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 160 may include one or more network access points. For example, the network 160 may include wired and/or wireless network access points such as base stations and/or internet exchange points through which one or more components of the imaging system 100 may be connected to the network 160 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage 130 may be a data storage including cloud computing platforms, such as, public cloud, private cloud, community, and hybrid clouds, etc. However, those variations and modifications do not depart the scope of the present disclosure.

FIG. 2 is a schematic diagram illustrating exemplary hardware and/or software components of an exemplary computing device 200 on which the processing engine 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 120 in accordance with techniques described herein. The computer instructions may include, for example, routines, programs, objects, components, data structures, procedures, modules, and functions, which perform particular functions described herein. For example, the processor 210 may process image data obtained from the scanner 110, the terminal(s) 140, the storage 130, and/or any other component of the Imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the scanner 110, the terminal(s) 140, the storage 130, and/or any other component of the Imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 120 for determining a regularization item.

The I/O 230 may input and/or output signals, data, information, etc. In some embodiments, the I/O 230 may enable a user interaction with the processing engine 120. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 160) to facilitate data communications. The communication port 240 may establish connections between the processing engine 120 and the scanner 110, the terminal(s) 140, and/or the storage 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
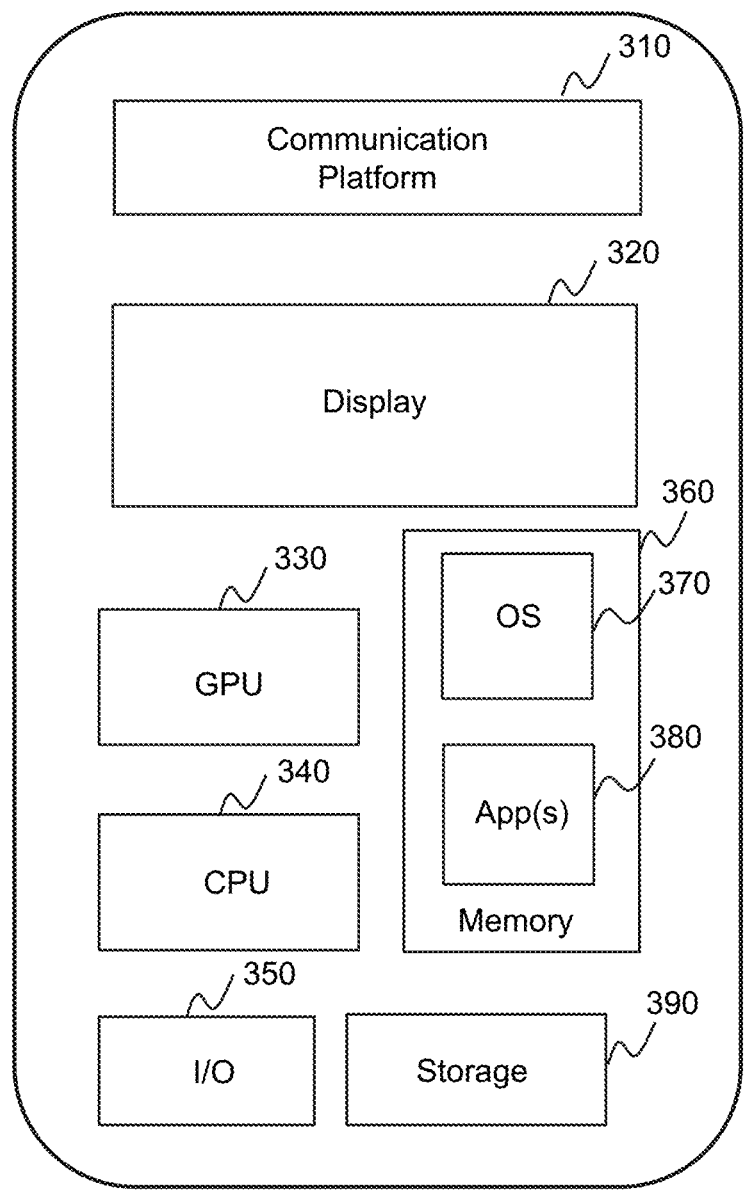
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminal(s) 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information respect to image processing or other information from the processing engine 120. User interactions with the information stream may be achieved via the I/O 350 and provided to the processing engine 120 and/or other components of the imaging system 100 via the network 160.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or external device. A computer may also act as a server if appropriately programmed.

Figure 4:
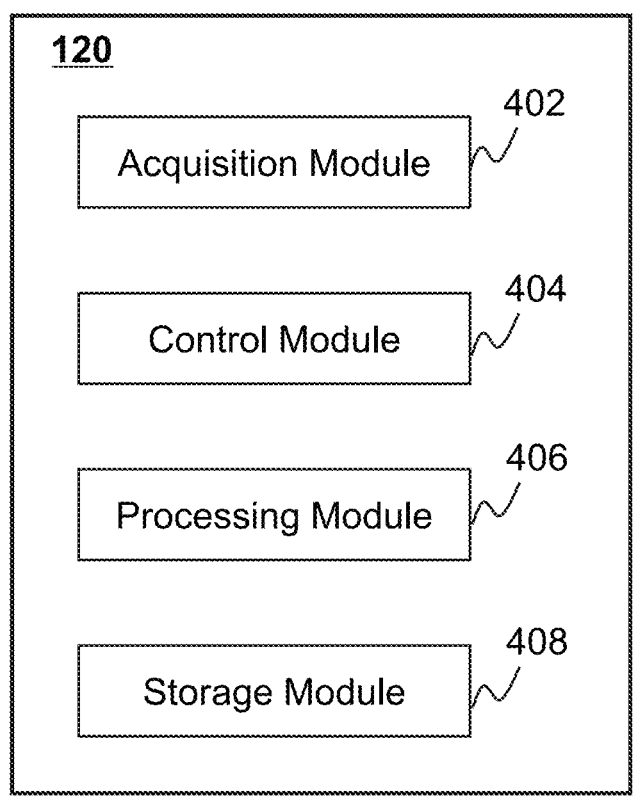
FIG. 4 is a block diagram illustrating an exemplary processing engine according to some embodiments of the present disclosure.

FIG. 4 is a schematic diagram illustrating an exemplary processing engine 120 according to some embodiments of the present disclosure. The processing engine 120 may include an acquisition module 402, a control module 404, a processing module 406, and a storage module 408. At least a portion of the processing engine 120 may be implemented on a computing device as illustrated in FIG. 2 or a mobile device as illustrated in FIG. 3.

The acquisition module 402 may acquire image data. In some embodiments, the acquisition module 402 may acquire the image data from the scanner 110, the storage 130, the terminal(s) 140, and/or an external data source (not shown). In some embodiments, the image data may include raw data (e.g., projection data), instructions, or the like, or a combination thereof. For example, the image data (e.g., projection data) may be generated based on the radiation beams (e.g., X-rays) that pass through a subject. The instructions may be executed by the processor(s) of the processing engine 120 to perform exemplary methods described in this disclosure. In some embodiments, the acquired data may be transmitted to the storage module 408 to be stored.

The control module 404 may control operations of the acquisition module 402, the storage module 408, the processing module 406 (e.g., by generating one or more control parameters), the scanner 110, or the like, or a combination thereof. For example, the control module 404 may control the acquisition module 402 to acquire image data, the timing of the acquisition of the image data, etc. As another example, the control module 404 may control the processing module 406 to process image data acquired by the acquisition module 402. As a further example, the control module 404 may control the operation of the scanner 110. In some embodiments, the control module 404 may receive a real-time instruction from an operator or retrieve a predetermined instruction provided by a user (e.g., a doctor) to control one or more operations of the scanner 110, the acquisition module 402, and/or the processing module 406. For example, the control module 404 may adjust the acquisition module 402 and/or the processing module 406 to generate one or more images of a subject according to the real-time instruction and/or the predetermined instruction. In some embodiments, the control module 404 may communicate with one or more other modules of the processing engine 120 for exchanging information and/or data.

The storage module 408 may store image data, control parameters, processed image data, or the like, or a combination thereof. In some embodiments, the storage module 408 may store one or more programs and/or instructions that may be executed by the processor(s) of the processing engine 120 to perform exemplary methods described in this disclosure. For example, the storage module 408 may store program(s) and/or instruction(s) that can be executed by the processor(s) of the processing engine 120 to acquire image data, reconstruct an image based on the image data, and/or display any intermediate result or a resultant image.

The processing module 406 may process information provided by various modules of the processing engine 120. The processing module 406 may process image data acquired by the acquisition module 402, image data retrieved from the storage module 408 and/or the storage 130, etc. In some embodiments, the processing module 406 may reconstruct one or more images based on the image data according to a reconstruction technique, generate reports including one or more images and/or other related information, and/or perform any other function for image reconstruction in accordance with various embodiments of the present disclosure. The reconstruction technique may include an iterative reconstruction algorithm (e.g., a statistical reconstruction algorithm), a Fourier slice theorem algorithm, a filtered back projection (FBP) algorithm, a fan-beam reconstruction algorithm, an analytic reconstruction algorithm, or the like, or any combination thereof. In some embodiments, the processing module 406 may reduce or remove motion artifacts and/or noise in iterative reconstruction.

In some embodiments, one or more modules illustrated in FIG. 4 may be implemented in at least part of the exemplary imaging system as illustrated in FIG. 1. For example, the acquisition module 402, the control module 404, the storage module 408, and/or the processing module 406 may be integrated into a console (not shown). Via the console, a user may set the parameters for scanning an object, controlling imaging processes, controlling the parameters for reconstruction of an image, adjusting the parameters for reducing or removing motion artifacts and/or noise, etc. In some embodiments, the console may be implemented via the processing engine 120 and/or the terminal(s) 140.

Figure 5:
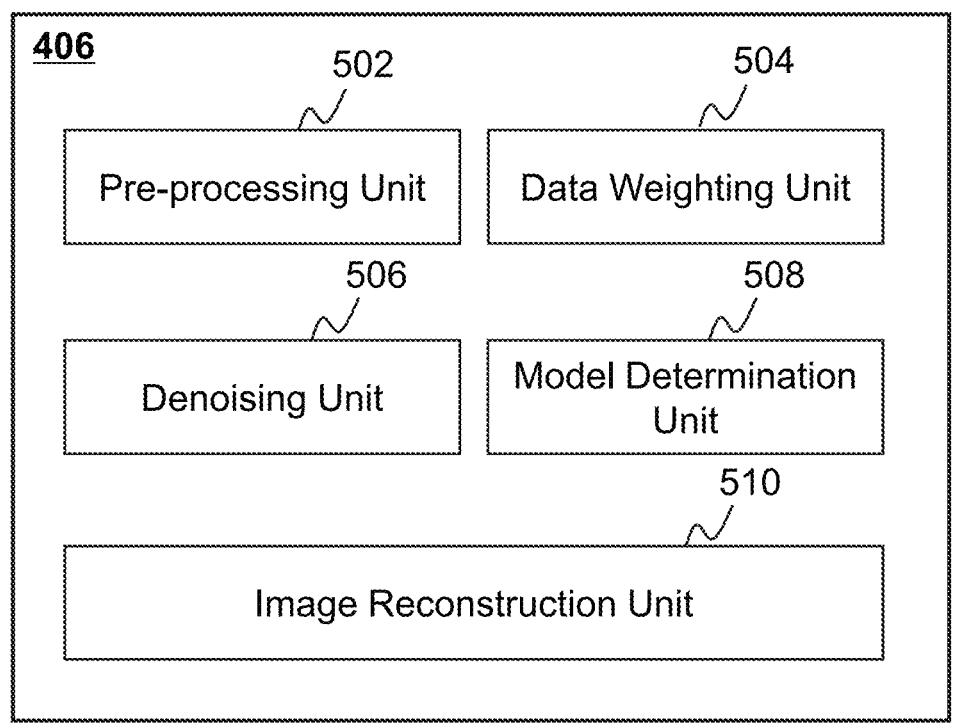
FIG. 5 is a block diagram illustrating an exemplary processing module according to some embodiments of the present disclosure.

FIG. 5 is a block diagram illustrating an exemplary processing module 406 according to some embodiments of the present disclosure. The processing module 406 may include a pre-processing unit 502, a data weighting unit 504, a denoising unit 506, a model determination unit 508, and an image reconstruction unit 510. The processing module 406 may be implemented on various components (e.g., the processor 210 of the computing device 200 as illustrated in FIG. 2). For example, at least a portion of the processing module 406 may be implemented on a computing device as illustrated in FIG. 2 or a mobile device as illustrated in FIG. 3.

The pre-processing unit 502 may pre-process image data. In some embodiments, the image data may include raw data (e.g., projection data). In some embodiments, the pre-processing unit 502 may perform pre-processing including, for example, image data normalization, image data smoothing, image data suppressing, image data encoding (or decoding), preliminary denoising, etc. In some embodiments, the pre-processing unit 502 may transmit the pre-processed image data to other units in the processing module 406 for further processing. For example, the pre-processing unit 502 may transmit the pre-processed image data to the data weighting unit 504 for weighting the pre-processed image data.

The data weighting unit 504 may weight image data. In some embodiments, the data weighting unit 504 may determine at least one portion of the image data for reconstructing an image. In some embodiments, the data weighting unit 504 may transmit the weighted image data to other units in the processing module 406 for further processing. For example, the data weighting unit 504 may transmit the weighted image data to the image reconstruction unit 506 for reconstructing an image. As another example, the data weighting unit 504 may transmit the weighted image data to the denoising unit 506 for denoising the image data.

The denoising unit 506 may denoise (or reduce the noise of) an image. In some embodiments, the denoising unit 506 may denoise an image reconstructed by the image reconstruction unit 510. In some embodiments, the denoising unit 506 may denoise the image based on a denoising model, for example, a Perona-Malik (P-M) model, a total variation (TV) model, a Fourier transform model, a wavelet transform model, a median filtering model, a Walsh-Hadamard transform model, a K-L transform model, or the like, or a combination thereof. In some embodiments, the denoising unit 506 may denoise the image in the process of image reconstruction. For example, the denoising unit 506 may denoise an intermediate image generated in an iteration of a plurality of iterations in iterative reconstruction.

The model determination unit 508 may determine one or more models. In some embodiments, the model may be represented by one or more functions, one or more matrixes, one or more equations, or the like, or a combination thereof. For example, the model may include an objective function, a weighting matrix, a denoising model, or the like, or a combination thereof. In some embodiments, the model determination unit 508 may transmit the model(s) to other units in the processing module 406 for further processing. For example, the model determination unit 508 may transmit the model(s) to the image reconstruction unit 510 for reconstructing an image. As another example, the model determination unit 508 may transmit the model(s) to the denoising unit 506 for denoising an image.

The image reconstruction unit 510 may reconstruct an image. The image may include a 2D image, a 3D image, a 4D image, or the like, or a combination thereof. The image reconstruction unit 510 may reconstruct the image based on the image data acquired by the acquisition module 402, the image data pre-processed by the pre-processing unit 502, etc. The image reconstruction unit 510 may generate and/or update the image (e.g., the image relating to the image data) based on one or more reconstruction techniques. Exemplary reconstruction techniques may include a statistical reconstruction, a filtered back projection (FBP), a total variation (TV) based image reconstruction, an iterative reconstruction, analytic reconstruction, or the like, or a combination thereof. In some embodiments, the image reconstruction unit 510 may transmit the reconstructed image to the terminal(s) 140 for display. In some embodiments, the image reconstruction unit 510 may transmit the reconstructed image to the storage module 408 and/or the storage 130 for storing.

It should be noted that the above description of the processing module 406 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the model determination unit 508 may be integrated into the data weighting unit 504, the denoising unit 508, and/or the image reconstruction unit 510. As another example, the pre-processing unit 503 may be omitted or integrated into the denoising unit 508.

Figure 6:
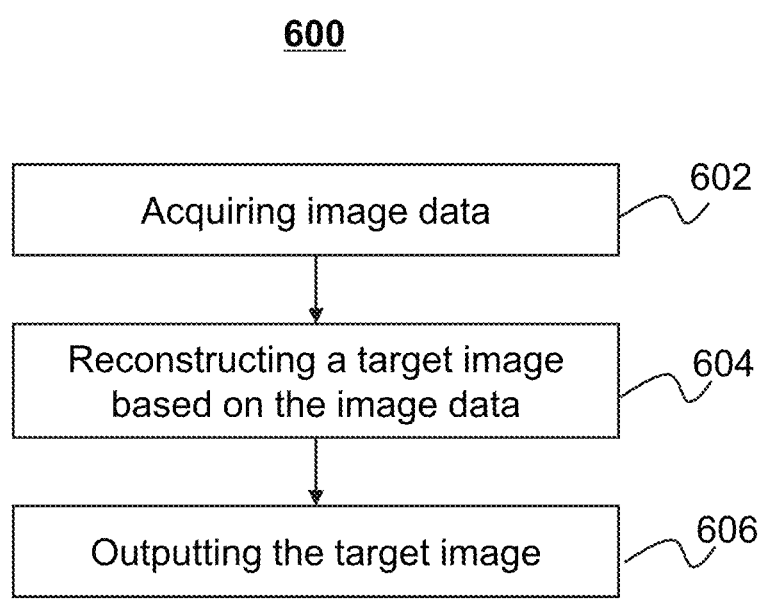
FIG. 6 is a flowchart illustrating an exemplary process for processing image data according to some embodiments of the present disclosure.

FIG. 6 is a flowchart illustrating an exemplary process 600 for processing image data according to some embodiments of the present disclosure. In some embodiments, process 600 may include obtaining image data 602, reconstructing a target image 604, and outputting the target image 606. In some embodiments, one or more operations of process 600 illustrated in FIG. 6 for processing image data may be implemented in the imaging system 100 illustrated in FIG. 1. For example, the process 600 illustrated in FIG. 6 may be stored in the storage 130 in the form of instructions, and invoked and/or executed by the processing engine 120 (e.g., the processor 210 of the computing device 200 as illustrated in FIG. 2, the CPU 340 of the mobile device 300 as illustrated in FIG. 3).

In 602, image data may be acquired. Operation 602 may be performed by the acquisition module 402. In some embodiments, the image data may be acquired from the scanner 110, the storage 130, the terminal(s) 140, or an external data source. As used herein, the image data may include data in the projection domain (also referred to as projection data or raw data), and data in the image domain. The projection data may indicate the attenuation occurred when radiation beams (e.g., X-rays) pass through a subject. In some embodiments, the projection data may be generated based on multiple projections at various angles around the subject using the scanner 110. In some embodiments, the image data may include a plurality of subsets of data detected by the detector array 114. A subset of data may be generated by a detector unit in the detector array 114. A detector unit in the detector array 114 may have a row index in the row direction and a channel index in the channel direction.

In 604, a target image may be reconstructed based on the image data. Operation 604 may be performed by the processing module 406. In some embodiments, the image may be reconstructed based on one or more reconstruction techniques mentioned in the disclosure. For example, the image may be reconstructed based on an iterative reconstruction technique. In some embodiments, the iterative reconstruction technique may include an algebraic reconstruction technique (ART), a simultaneous iterative reconstruction technique (SIRT), a multaneous algebraic reconstruction technique (SART), an adaptive statistical iterative reconstruction (ASIR) technique, a model based iterative reconstruction (MBIR) technique, a sinogram affirmed iterative reconstruction (SAFIR) technique, or the like, or a combination thereof. In some embodiments, the iterative reconstruction technique may be combined with an optimization technique for reconstructing the target image. The optimization technique may be used to identify an optimal solution of an objective function among a plurality of image estimates as the target image. In some embodiments, an image estimate that may minimize or maximize a value of the objective function may be designated as an optimal solution, also referred to as the target image.

In 606, the target image may be outputted. Operation 606 may be performed by the processing module 406. In some embodiments, the target image may be outputted to the terminal(s) 140 for display. In some embodiments, the target image may be outputted to the storage 130 and/or the storage module 408 for storing.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, process 600 may include an operation for pre-processing the image data before 604.

Figure 7:
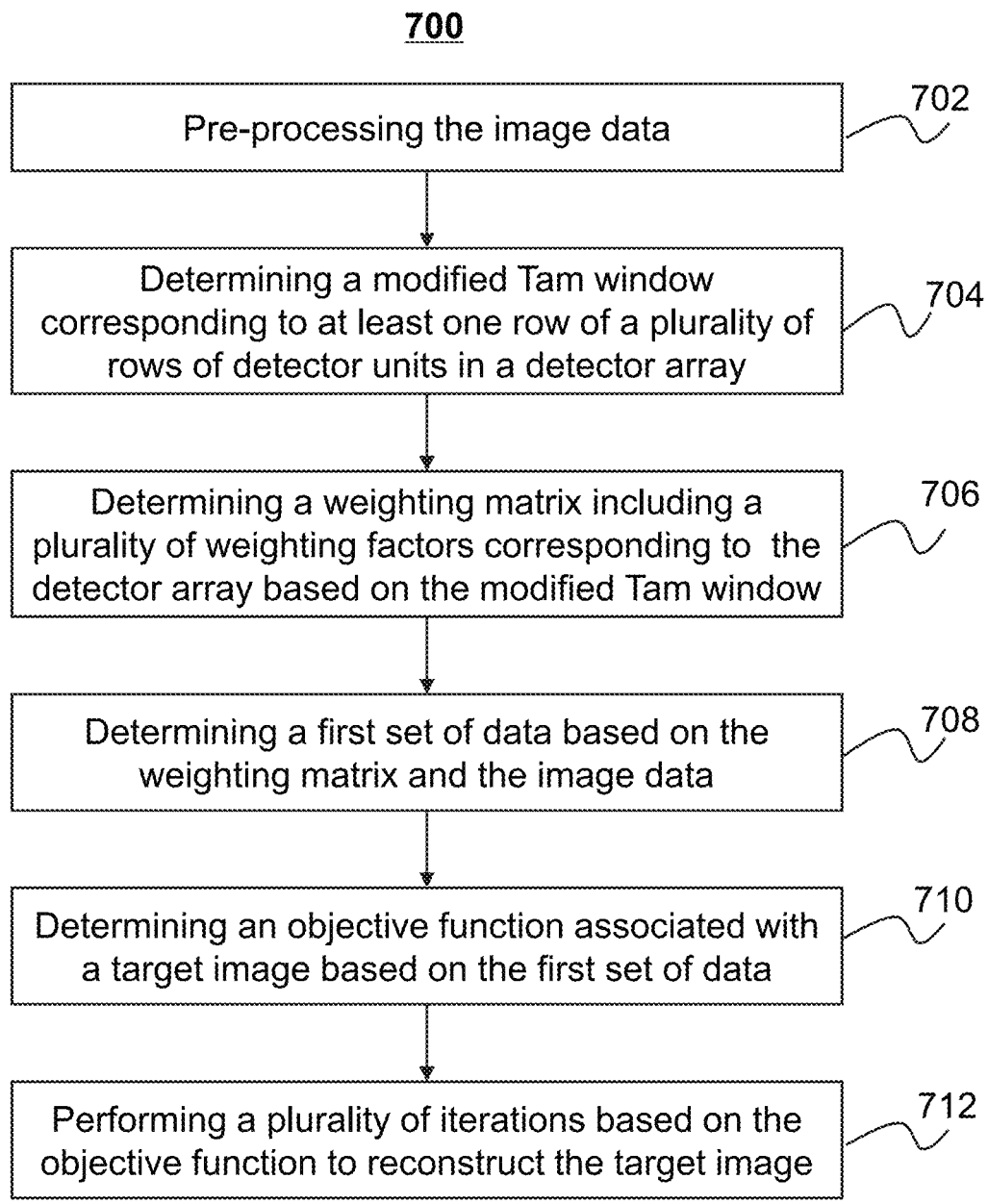
FIG. 7 is a flowchart illustrating an exemplary process for reconstructing an image according to some embodiments of the present disclosure.

FIG. 7 is a flowchart illustrates an exemplary process 700 for reconstructing an image according to some embodiments of the present disclosure. Process 700 may be performed by the processing module 406. In some embodiments, operation 604 illustrated in FIG. 6 may be performed according to the process 700. In some embodiments, one or more operations of process 700 illustrated in FIG. 7 for reconstructing an image may be implemented in the imaging system 100 illustrated in FIG. 1. For example, the process 700 illustrated in FIG. 7 may be stored in the storage 130 in the form of instructions, and invoked and/or executed by the processing engine 120 (e.g., the processor 210 of the computing device 200 as illustrated in FIG. 2, the CPU 340 of the mobile device 300 as illustrated in FIG. 3).

In 702, the image data may be pre-processed. Operation 702 may be performed by the pre-processing unit 502. In some embodiments, the image data may be acquired as described in connection with operation 602. In some embodiments, the pre-processing operation may include normalizing the image data, smoothing the image data, suppressing the image data, encoding (or decoding), preliminary denoising the image data, etc. In some embodiments, the image data may be denoised based on a noise statistical model. The noise statistical model may include a Gaussian noise model, a Rayleigh noise model, a Gamma noise model, an exponential distribution noise model, a uniform noise distribution model, an impulsive noise distribution model, or the like, or a combination thereof.

In 704, a modified Tam window corresponding to at least one row of a plurality of rows of detector units in a detector array (e.g., the detector array 114) may be determined. Operation 704 may be performed by the model determination unit 508. In some embodiments, the detector array (e.g., the detector array 114) may include a plurality of rows of detector units. The plurality of rows of detector units may be arranged in a row direction and a channel direction. The modified Tam window may be used to determine a range of detector units from the detector array. See, for example, FIGS. 11A-11C. The plurality of detector units in the range corresponding to a Tam window may generate a minimum set of data needed for reconstructing an image, as described in U.S. Pat. No. 5,390,112 entitled "Three-dimensional computerized tomography scanning method and system for imaging large objects with small area detectors," issued Feb. 14, 1995, the contents of which are hereby incorporated by reference.

Figure 11A:
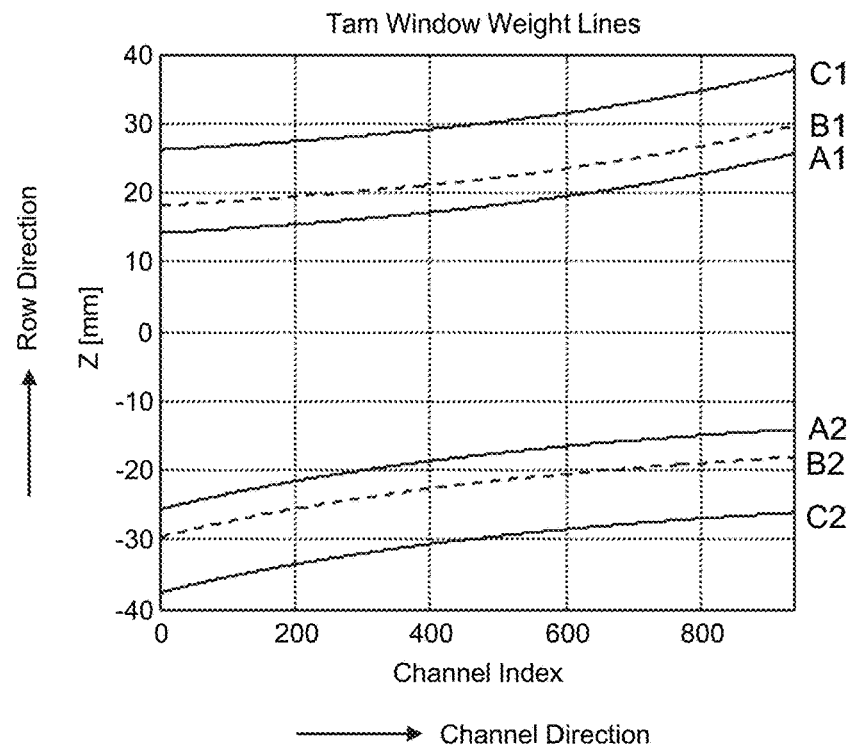
FIG. 11A is a diagram illustrating a modified Tam window according to some embodiments of the present disclosure.

In some embodiments, the modified Tam window may include two boundaries (e.g., the lines C1 and C2 as illustrated in FIG. 11A). The two boundaries may be defined by projecting a scanning locus of a radiation source (e.g., the tube 112) rotating 360 degrees onto a plane defined by the detector array. In some embodiments, the modified Tam window may be determined based on a pitch and a position of a detector unit in the channel direction. As used herein, the pitch may be a ratio of a forward distance of a table (e.g., the table 116) during which a radiation source (e.g., the tube 112) rotates 360 degrees to a thickness of radiation beams emitted by the radiation source. In some embodiments, the pitch P may be determined based on the product of a width of collimation and a pitch factor (e.g., a constant in a range from 0.3 to 1.4). In some embodiments, the width of collimation may be a default value determined by the imaging system 100, or may be preset by a user or operator via the terminal(s) 140.

In some embodiments, a Tam window may be determined according to Equations (1) and (2) as illustrated below:

$$b_1(iChannel)=P*(\pi+2*r)/(4*\pi*\cos(r)), \qquad (1)$$

$$b_2(iChannel)=P*(-\pi+2*r)/(4*\pi*\cos(r)), \qquad (2)$$

where $b_1$ and $b_2$ denote two boundaries of the Tam window (e.g., the lines A1 and A2 as illustrated in FIG. 11A), i denotes a position of a detector unit in the channel direction (e.g., the horizontal axis in FIG. 11A), P denotes a pitch, and r denotes an angle of the detector unit i with respect to the channel direction. In some embodiments, a center row of the detector units in the detector array may be defined as a reference row (e.g., the horizontal axis with a Z value labelled as 0 in FIG. 11A). Then the Tam window corresponding to the center row of detector units defined by the channel direction may be determined according to Equations (1) and (2). In some embodiments, the Tam window may be extended to obtain a modified Tam window. More descriptions of the extension of the Tam window may be found elsewhere in the present disclosure. See, for example, Equation (3) and the description thereof.

In 706, a weighting matrix including a plurality of weighting factors corresponding to the detector array may be determined based on the modified Tam window. Operation 706 may be performed by the model determination unit 508. In some embodiments, a weighting factor in the weighting matrix may correspond to a detector unit in the detector array arranged in the row direction and the channel direction. In some embodiments, the weighting factor may include a value in a range from 0 to 1. The value of the weighting factor may be determined based on a position of the detector unit in the row direction and the channel direction. For example, if a detector unit is far away from a center row of the detector array, the value of the weighting factor corresponding to the detector unit may be relatively small (e.g., close to 0 or equal to 0). As another example, if a detector unit is close to the center row of the detector array, the value of the weighting factor corresponding to the detector unit may be relatively high (e.g., close to 1 or equal to 1). Since a detector unit may generate a subset of data, and a detector unit may have a corresponding weighting factor, the subset of data generated by the detector unit may have the corresponding weighting factor.

In some embodiments, the weighting factors of a plurality of detector units may be used to extend a range of a Tam window determined based on Equations (1) and (2). For example, if a detector unit has a weighting factor other than 0, the detector unit may be included in an extended Tam window. If a detector unit has a weighting factor equal to 0, the detector unit may not be included in an extended Tam window. In some embodiments, if a subset of data are generated by a detector unit that has a weighting factor other than 0, the subset of data may be used to reconstruct a target image. Therefore, the target image may be reconstructed based on a plurality of subsets of data generated by a plurality of detector units that have weighting factors other than 0. Meanwhile, the subsets of data may be multiplied by corresponding weighting factors in image reconstruction. For example, if a subset of data have a weighting factor of 1, the subset of data may be multiplied by 1. As another example, if a subset of data have a weighting factor of 0.5, the subset of data may be multiplied by 0.5.

In some embodiments, the Tam window may be extended. The extended or modified Tam window may correspond to the weighting matrix. In some embodiments, the weighting matrix may be determined according to Equation (3) as illustrated below:

$$w_{Tam}(t) = \begin{cases} \cos\left(\frac{pi}{2}*(TW_- - ST1 - t)^2\right), & t \in [TW_- - ST1 - ST2, TW_- - ST1) \\ 1, & t \in [TW_- - ST1, TW_+ + ST1] \\ \cos\left(\frac{pi}{2}*(t - (TW_+ + ST1))^2\right), & t \in (TW_+ + ST1, TW_+ + ST1 + ST2] \end{cases} \qquad (3)$$

where $w_{Tam}(t)$ denotes the weighting matrix, t denotes the position of a detector unit on the row direction, pi denotes the π, $TW_+$ denotes the upper boundary of a modified Tam window, also referred to as $b_1$ as illustrated in 704 (e.g., the line A1 as illustrated in FIG. 11A), $TW_-$ denotes the lower boundary of the modified Tam window, also referred to as $b_2$ as illustrated in 704 (e.g., the line A2 as illustrated in FIG. 11A), and ST1 and ST2 respectively denote a first parameter and a second parameter to adjust the range of the modified Tam window. In some embodiments, $TW_+$ and $TW_-$ may be determined according to Equations (1) and (2).

As illustrated in Equation (3), the weighting matrix may be determined based on a piecewise function. Detector units located in different position ranges may have different weighting factors. For instance, there may be three position ranges in the row direction, including a first range, a second range, and a third range. The three position ranges may be adjusted by the parameters ST1 and ST2. The first range may be from $TW_-$–ST1–ST2 to $TW_-$–ST1. The second range may be from $TW_-$–ST1 to $TW_+$+ST1. The third range may be from $TW_+$+ST1 to $TW_+$+ST1+ST2. Then the weighting factors may be determined according to Equation (3).

Figure 11B:
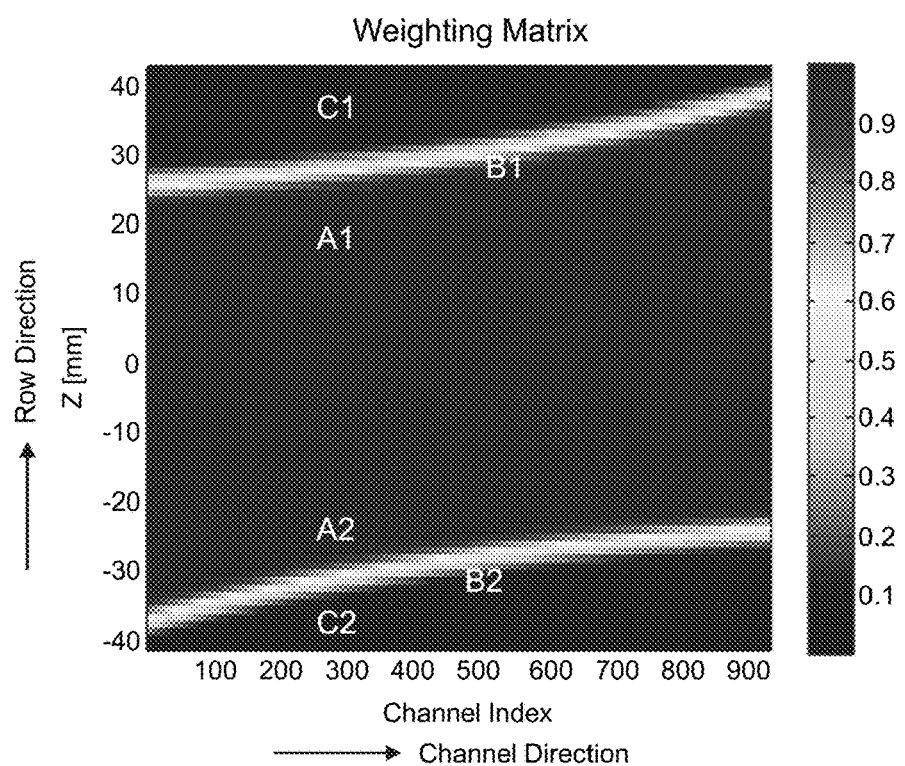
FIG. 11B is a diagram illustrating a weighting matrix according to some embodiments of the present disclosure.
Figure 11C:
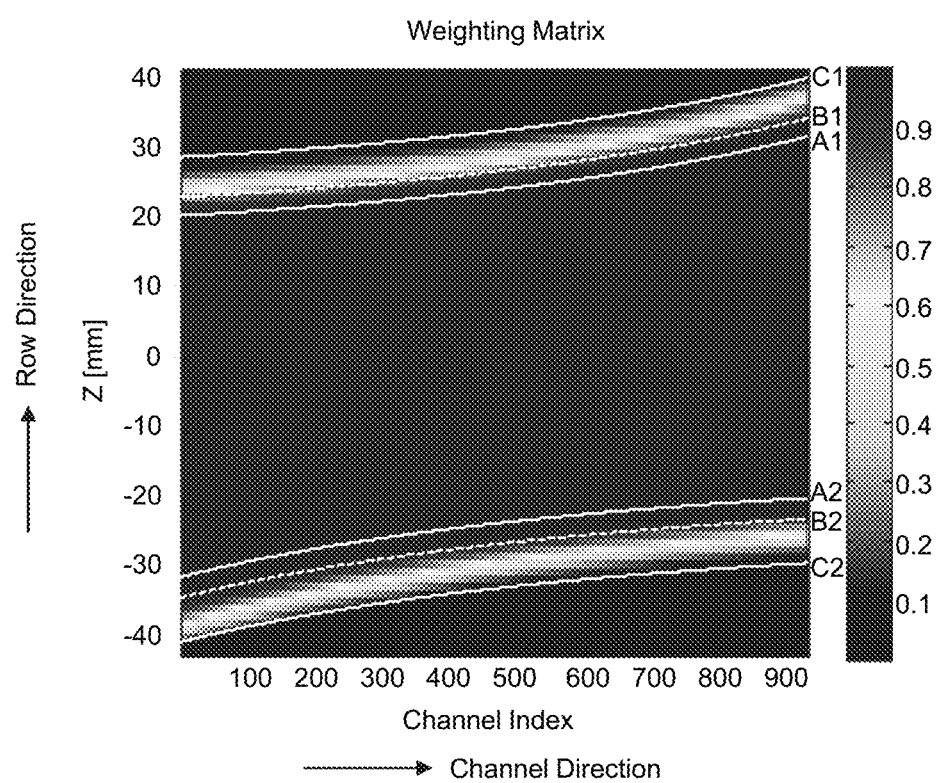
FIG. 11C is a diagram illustrating a combination of a modified Tam window and a weighting matrix according to some embodiments of the present disclosure.

In some embodiments, the first parameter ST1 and/or the second parameter ST2 may be constants pre-determined by a user or operator according to clinical demands or experience. In some embodiments, the first parameter ST1 may be in a range from 0 to 10. In some embodiments, the second parameter ST2 may be in a range from 0 to 10. For example, the first parameter ST1 may be 4, and the second parameter ST2 may be 8. As shown in Equation (3), the first parameter ST1 may define the second range. The detector units located in the second range may have a first set of weighting factors equal to 1 (e.g., an extended range between the lines B1 and B2 as illustrated in FIGS. 11A-11C). The first parameter ST1 and the second parameter ST2 may define the first range and the third range. The detector units located in the first range or the third range may have a second set of weighting factors greater than or equal to 0 and less than 1 (e.g., a range between the lines B1 and C1, and a range between the lines B2 and C2 as illustrated in FIGS. 11A-11C).

In 708, a first set of data may be determined based on the weighting matrix determined in 706 and the image data acquired in 602. Operation 708 may be performed by the data weighting unit 504. In some embodiments, the image data may include a plurality of subsets of data detected by a plurality of rows of detector units in the detector array. In some embodiments, the plurality of subsets of data may be represented by an image data matrix. The first set of data may be determined by performing a dot product of the weighting matrix and the image data matrix. As used herein, the dot product of the weighting matrix and the image data matrix may be determined by multiplying a total amount of data in the subset of data and the weighting factor in the weighting matrix. For example, if the weighting factor is 1, the whole subset of data may be included in the first set of data. As another example, if the weighting factor is 0.5, the subset of data multiplied by 0.5 may be included in the first set of data. As still another example, if the weighting factor is 0, the whole subset of data may be excluded from the first set of data.

In 710, an objective function associated with a target image may be determined based on the first set of data. Operation 710 may be performed by the model determination unit 508. In some embodiments, the objective function may be determined according to process 900 as described in connection with FIG. 9. In some embodiments, the objective function may be used to determine a target image (also referred to as an optimal image) by minimizing or maximizing a value of the objective function. In some embodiments, the objective function may include a least square function, a least norm function, a quadratic optimization function, a Bayes estimation function, a maximum likelihood estimation (MLE) function, a maximum a posterior (MAP) function, a minimum variance function, a maximum entropy function, or the like, or a combination thereof.

In 712, a plurality of iterations may be performed based on the objective function determined in 710 to reconstruct the target image. Operation 712 may be performed by the image reconstruction unit 510. In some embodiments, the plurality of iterations may be performed according to process 1000 as described in connection with FIG. 10. In some embodiments, an image estimate may be determined in an iteration. A projection estimate corresponding to the image estimate may be determined by projecting the image estimate onto a specific projection plane. The projection estimate may be compared with the raw data (e.g., projection data), and a target image may be determined by updating the image estimate based on a difference between the projection estimate and the raw data (e.g., projection data).

In some embodiments, the plurality of iterations may be ended if a preset condition is satisfied. In some embodiments, the preset condition may be assessed based on a value of the objective function or an image estimate generated in an iteration. For example, the preset condition may include that the value of the objective function may be minimal or smaller than a threshold, the change of the value of the objective function in two or more consecutive iterations may be equal to or smaller than a threshold, the difference between the value of the objective function and a target value is equal to or smaller than a threshold, etc. As another example, the preset condition may include that the change of the average gray value of pixels or voxels in the image estimates generated in two or more consecutive iterations may be equal to or smaller than a threshold, such as 0, or the difference between the average gray value of pixels or voxels in the updated image estimate and a target value is below a threshold. In some embodiments, the preset condition may be satisfied when a specified number of iterations are performed.

It should be noted that the description of the process 700 is provided for the purposes of illustration, and not intended to limit the scope of the present disclosure. For persons having ordinary skills in the art, various variations and modifications may be conducted under the teaching of the present disclosure. However, those variations and modifications may not depart from the protecting of the present disclosure. For example, operations 706 and 708 may be performed simultaneously. As another example, operation 702 may be optional.

Figure 8:
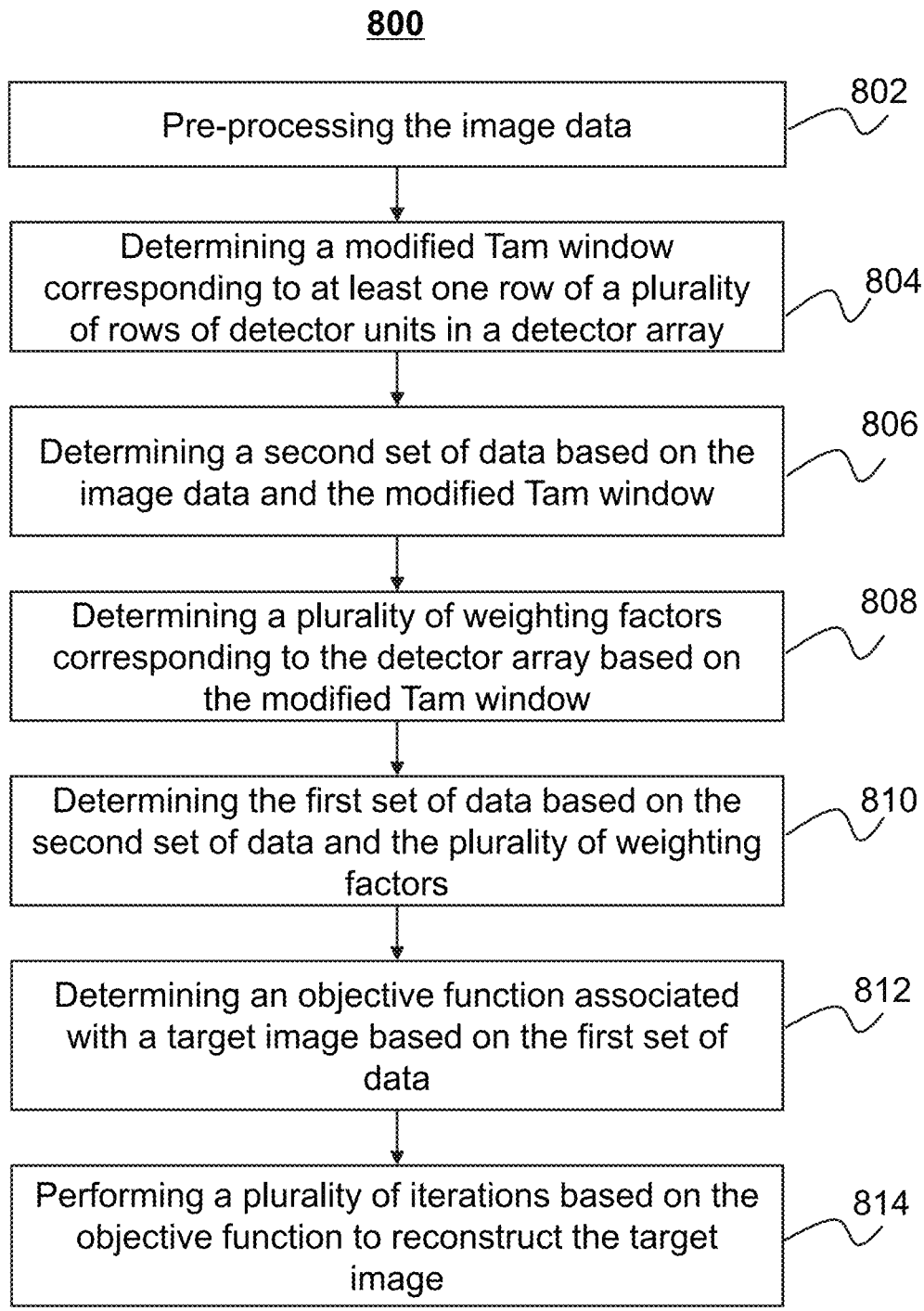
FIG. 8 is a flowchart illustrating another exemplary process for reconstructing an image according to some embodiments of the present disclosure.

FIG. 8 is a flowchart illustrates another exemplary process 800 for reconstructing an image according to some embodiments of the present disclosure. Process 800 may be performed by the processing module 406. In some embodiments, operation 604 illustrated in FIG. 6 may be performed according to the process 800. Operation 802, operation 804, operation 812, and operation 814 are similar to operation 702, operation 704, operation 710, and operation 712 in FIG. 7, respectively, and are not repeated here. In some embodiments, one or more operations of process 800 illustrated in FIG. 8 for reconstructing an image may be implemented in the imaging system 100 illustrated in FIG. 1. For example, the process 800 illustrated in FIG. 8 may be stored in the storage 130 in the form of instructions, and invoked and/or executed by the processing engine 120 (e.g., the processor 210 of the computing device 200 as illustrated in FIG. 2, the CPU 340 of the mobile device 300 as illustrated in FIG. 3).

In 806, a second set of data may be determined based on the image data and the modified Tam window. Operation 806 may be performed by the acquisition module 402. In some embodiments, the second set of data may be generated by the detector units located in the range of the modified Tam window. In some embodiments, the Tam window may be modified or extended as described in FIG. 7.

In 808, a plurality of weighting factors corresponding to the detector array may be determined based on the modified Tam window (also referred to as the extended Tam window). Operation 808 may be performed by the model determination unit 508. In some embodiments, the plurality of weighting factors may correspond to a plurality of detector units located within the range of the extended Tam window but beyond the original Tam window. The original Tam window may refer to the Tam window before extension. In some embodiments, the plurality of weighting factors may be determined according to operation 706.

In 810, the first set of data may be determined based on the second set of data and the weighting factors. Operation 810 may be performed by the data weighting unit 504. In some embodiments, a third set of data may be determined based on the weighting factors. For example, the third set of data may be determined by multiplying the weighting factors and a plurality of subsets of data generated by the detector units located within the range of extended Tam window but beyond the original Tam window. Then, the first set of data may be a collection of the second set of data and the third set of data. As used herein, the multiplication of the weighting factors and the subsets of data may refer to multiply all data in a subset of data by a weighting factor.

It should be noted that the description of the process 800 is provided for the purposes of illustration, and not intended to limit the scope of the present disclosure. For persons having ordinary skills in the art, various variations and modifications may be conducted under the teaching of the present disclosure. However, those variations and modifications may not depart from the protecting of the present disclosure. For example, operation 802 may be optional.

In some embodiments, the first set of data as described in FIG. 7 and FIG. 8 may be determined based on the image data (e.g., the image data acquired in 602, the image data pre-processed in 702, and/or the image data pre-processed in 802) and a weighting window. In some embodiments, the weighting window may indicate a range of detector units in a detector array (e.g., the detector array 114), and the signal(s) detected by the detector unit(s) in the range may be used for image reconstruction. Using the weighting window, one or more signals may be weighted by one or more weighting factors before image reconstruction. The weighting factor(s) may be in a range from 0 to 1. In some embodiments, the weighting window may be a modified Tam window. In some embodiments, the weighting window may be determined based on one or more parameters relating to the detector array. The parameter(s) may include a first number of the detector units in the row direction, a second number of the detector units in the channel direction, a pitch, and/or an angle of one of the detector units with respect to the channel direction. In some embodiments, the first set of data may be determined based on the image data, the weighting window, and/or a weighting matrix (as described in FIG. 7 and FIG. 8). In some embodiments, the first set of data may be determined by processing the image data using the weighting matrix. In some embodiments, the weighting matrix may correspond to the weighting window. In some embodiments, the weighting matrix may be a mathematical expression of the weighting window.

Figure 9:
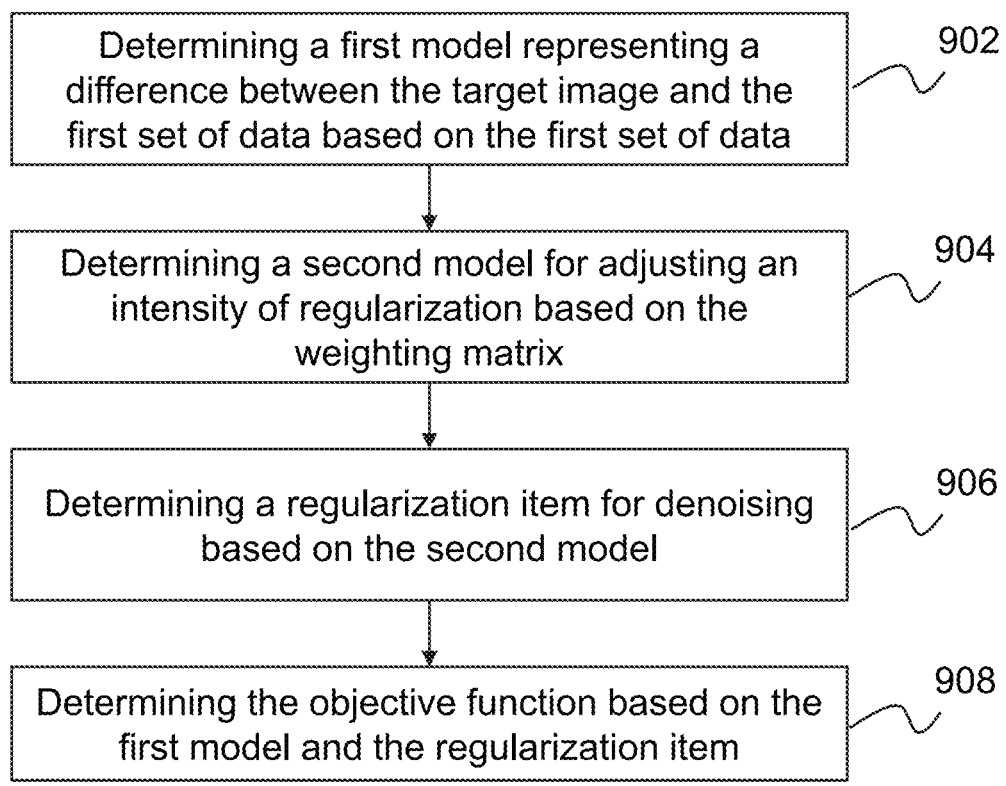
FIG. 9 is a flowchart illustrating an exemplary process for determining an objective function according to some embodiments of the present disclosure.

FIG. 9 is a flowchart illustrating an exemplary process 900 for determining an objective function according to some embodiments of the present disclosure. Process 900 may be performed by the model determination unit 508. In some embodiments, operation 710 illustrated in FIG. 7 and/or operation 812 illustrated in FIG. 8 may be performed according to process 900. In some embodiments, one or more operations of process 900 illustrated in FIG. 9 for determining an objective function may be implemented in the imaging system 100 illustrated in FIG. 1. For example, the process 900 illustrated in FIG. 9 may be stored in the storage 130 in the form of instructions, and invoked and/or executed by the processing engine 120 (e.g., the processor 210 of the computing device 200 as illustrated in FIG. 2, the CPU 340 of the mobile device 300 as illustrated in FIG. 3).

In 902, a first model may be determined based on the first set of data. The first set of data may be determined as described in connection with FIG. 7 and/or FIG. 8. In some embodiments, the first model may represent a difference between the first set of data and the projection of an image estimate. For example, the first model may be determined based on a subtraction of the first set of data and the projection of an image estimate. As anther example, the first model may be determined based on a ratio of the first set of data to the projection of an image estimate. In some embodiments, the image estimate may include the target image. The projection of the image estimate may be determined by projecting the image estimate onto a specific projection plane. In some embodiments, the projection of the image estimate may be determined based on the image estimate and a projection matrix. For example, the projection of the image estimate may be determined by multiplying the projection matrix by the image estimate. In some embodiments, the projection matrix may include a first set of elements. Each of the first set of elements may correspond to an element in the first set of data. As used herein, an element of the first set may correspond to a pixel in the image estimate. In some embodiments, the determination of an element of the first set of elements in the projection matrix may include providing a projection line with a specific width traversing the image estimate, determining a traversing area where the projection line traverses a pixel that is regarded as any shape with an area, and determining a ratio of the traversing area to the area of the pixel as an element of the first set of elements. In some embodiments, the projection matrix may be part of default settings of the processing engine 120, or may be adjusted by a user (e.g., a doctor).

In 904, a second model for adjusting an intensity of regularization (or penalty) may be determined based on the weighting matrix. In some embodiments, the second model may include a second set of elements. The second model may be expressed in the form of a matrix. An element of the second set may correspond to a pixel in an image estimate generated in an iteration. For example, if an image estimate has 9×9 pixels, the second model may include 81 elements. In some embodiments, the second model may be used to predict noise distribution and/or noise intensity in the image estimate. For example, if elements of the second set of elements in the second model are relatively great, the noise intensity in the image estimate may be great. In some embodiments, the second model may be used to adjust an intensity for regularizing the image estimate. For example, if elements of the second set of elements in the second model are relatively great, the strength for denoising the image estimate may be great. In some embodiments, the second model may be determined based on a weighting matrix and a projection matrix determined as described in FIG. 7 and/or FIG. 8. For example, the second model may be determined based on an image data matrix weighted by the weighting matrix, the modified Tam window, and a square of a back-projection of the weighted image data matrix. In some embodiments, the image data matrix may be defined by image data including a plurality of subsets of data as described in connection with FIG. 6. In some embodiments, the image data matrix may be pre-determined by a user or operator. For example, the image data matrix may include a plurality of elements with values equal to 1.

In some embodiments, the second model may be determined according to Equation (4) as illustrated below:

$$\text{second model} = M \cdot \sum_{1}^{viewnumber} a_{i,j}^2 (w_{Tam}^2 \cdot 1), \tag{4}$$

where M denotes the number of the elements in the projection matrix, i denotes a pixel in an image estimate, j denotes a projection line j traversing the pixel, $a_{i,j}$ denotes an element in the projection matrix corresponding to a pixel i and a projection line j, $w_{Tam}$ denotes the weighting matrix, and the viewnumber denotes the number of projection lines traversing a pixel i. As illustrated by Equation (4), the determination of the second model may include performing a dot product of an image data matrix and the square of the weighting matrix, performing a summation of each column of the square of the projection matrix to generate a back-projection matrix, and multiplying the back-projection matrix by the weighted image data matrix. As used herein, the image data matrix may include a plurality of elements equal to 1.

In 906, a regularization item for denoising may be determined (or adjusted) based on the second model. As used herein, the regularization item (e.g., R(X) in Equation (5)) may refer to an item that may be used to regularize image estimate(s) generated during an iterative reconstruction process. In some embodiments, the regularization item may include a regularization parameter and/or a denoising model.

For example, the regularization item may be determined by multiplying the regularization parameter by the denoising model.

The regularization parameter may be used to control the strength of the regularization item (also referred to as the intensity for denoising). In some embodiments, the regularization parameter may include a third set of elements. The regularization parameter may be expressed in the form of a matrix. Each of the third set of elements may correspond to an element in an image estimate. For example, if an image estimate has 8×9 pixels, the regularization parameter may include 72 elements. Each of the 72 elements may correspond to a pixel of the image estimate. In some embodiments, the regularization parameter may be determined based on the second model. For example, the greater the element in the second model is, the greater the corresponding element in the regularization parameter may be. As used herein, an element in the second model and a corresponding element in the regularization parameter may refer to two elements corresponding to a same pixel in an image estimate.

The denoising model may be used to denoise an image estimate generated in an iteration. In some embodiments, the denoising model may include a spatial-domain filter model, a transform-domain filter model, a morphological noise filter model, or the like, or a combination thereof. The spatial-domain filter model may include a field average filter model, a median filter model, a Gaussian filter model, or the like, or a combination thereof. The transform-domain filter model may include a Fourier transform model, a Walsh-Hadamard transform model, a cosine transform model, a K-L transform model, a wavelet transform model, or the like, or a combination thereof. In some embodiments, the denoising model may include a partial differential model or a variational model, such as a Perona-Malik (P-M) model, a total variation (TV) model, or the like, or a combination thereof.

In 908, the objective function may be determined based on the first model determined in 902 and the regularization item determined in 906. In some embodiments, the objective function may be determined based on a least squares technique. The least squares technique may be used to determine an optimal solution that minimizes the sum of the squares of the difference between a value estimate and an observed value. As used herein, the optimal solution may refer to a target image, the value estimate may refer to a projection estimate corresponding to an image estimate generated in an iteration, and the observed value may refer to the first set of data.

In some embodiments, the objective function may be a sum of the 2-norm of first model (also referred to as an inner-product of the first model) and the regularization item. As illustration purposes, the objective function may take a form as denoted by the following Equation (5):

$$f(X) = \min_{X \geq 0} \|AX - Y\|_w^2 + \beta R(X), \quad (5)$$

where $f(X)$ denotes the objective function, $AX-Y$ denotes the first model, X denotes an image to be reconstructed (also referred to as an image estimate, or a target image), Y denotes the first set of data, A denotes a projection matrix, $\beta R(X)$ denotes a regularization item, $\beta$ denotes a regularization parameter (also referred to as a penalty coefficient), $R(X)$ denotes a denoising model as described elsewhere in the disclosure, w denotes a statistical weight (e.g., a constant) determined based on a noise statistical model as described elsewhere in the disclosure, and $$\min_{X \geq 0}$$

denotes a preset condition or a constraint as described elsewhere in the disclosure. In some embodiments, the regularization parameter $\beta$ may have various modifications. For example, the regularization parameter $\beta$ may be adjusted based on the second model determined in 904.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the objective function may be a minimum variance function.

Figure 10:
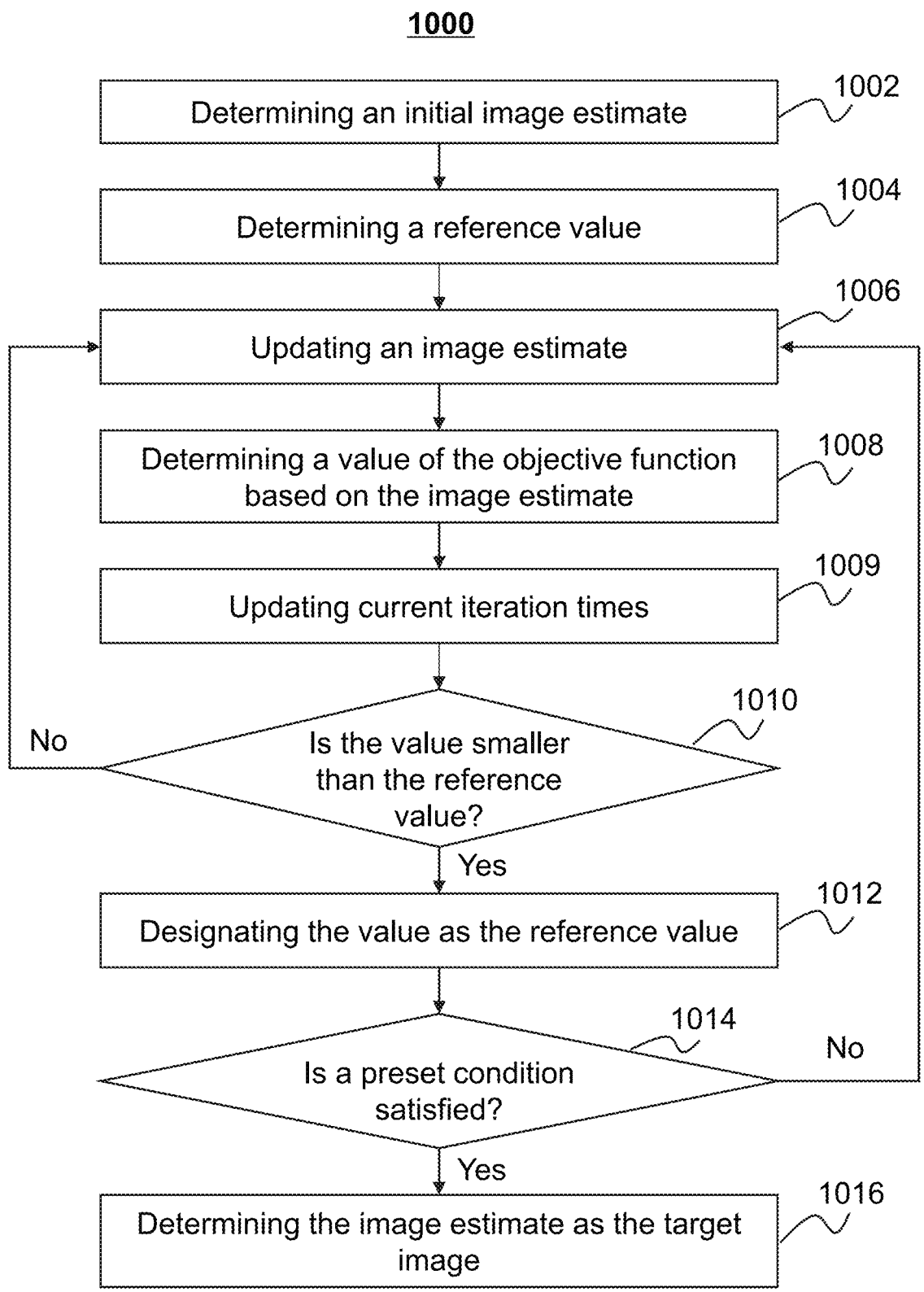
FIG. 10 is a flowchart illustrating an exemplary process for an iterative reconstruction according to some embodiments of the present disclosure.

FIG. 10 is a flowchart illustrating an exemplary process 1000 for iterative reconstruction according to some embodiments of the present disclosure. Process 1000 may be performed by the image reconstruction unit 510. In some embodiments, operation 712 illustrated in FIG. 7 and/or operation 814 illustrated in FIG. 8 may be performed according to the process 1000. In some embodiments, one or more operations of process 1000 illustrated in FIG. 10 for iterative reconstruction may be implemented in the imaging system 100 illustrated in FIG. 1. For example, the process 1000 illustrated in FIG. 10 may be stored in the storage 130 in the form of instructions, and invoked and/or executed by the processing engine 120 (e.g., the processor 210 of the computing device 200 as illustrated in FIG. 2, the CPU 340 of the mobile device 300 as illustrated in FIG. 3).

In 1002, an initial image estimate may be determined. In some embodiments, the initial image estimate may include a plurality of pixels or voxels with estimated characteristics, such as gray value, intensity, color, etc. In some embodiments, the initial image estimate may be part of default settings of the processing engine 120. In some embodiments, the gray values of pixels or voxels in the initial image estimate may be set as different values or the same value. For example, the gray values of pixels or voxels in the initial image estimate may be set as 0. In some embodiments, an initial value (e.g., 0, etc.) for current iteration times may be determined in 1002.

In 1004, a reference value of the objection function may be determined. In some embodiments, the value of the objection function corresponding to the initial image estimate may be designated as the reference value. In some embodiments, the reference value may be set as a value smaller than a threshold before the first iteration. The threshold may be preset by a user or operator, or set automatically by the imaging system 100 according to, e.g., a default setting of the imaging system 100. For example, the reference value may be any other value smaller than 1.

In 1006, an image estimate may be updated. In some embodiments, a plurality of iterations may be performed based on the objective function. While in any other iteration, the image estimate may be updated based on a reconstructed image generated in a previous iteration. In some embodiments, if the objective function is in the form of Equation (5), the image estimate may be determined according to the following Equation (6):

$$X^k = X^{k-1} - \alpha \cdot \frac{M \cdot BP_{subset}(W \cdot (FP(X^{k-1}) - Y)) + \beta \cdot \sqrt{\text{model}} \cdot \dot{R}(X^{k-1})}{BP(W \cdot FP(\mathbb{I})) + \beta \cdot \sqrt{\text{model}} \cdot \ddot{R}(X^{k-1})}, \quad (6)$$

where $X^k$ may denote an image estimate obtained in the kth iteration, M denotes the number of subsets of image data, W may denote a statistical weight (e.g., a matrix relating to the raw data), BP may denote a back projection, FP may denote a forward projection, β may denote a regularization parameter, $\dot{R}$ may denote a first derivative of the regularization item, $\ddot{R}$ may denote a second derivative of the regularization item, α may denote an iteration step length (e.g., a constant), and FP(II) may denote performing a forward projection on a preset image including a plurality of elements (e.g., pixels) with values equal to 1.

In 1008, a value of the objective function may be determined based on the image estimate. In some embodiments, the value of the objective function may be determined according to Equation (5). For example, the value of the objective function may be determined by substituting the magnitude of the image estimate into the objective function. In some embodiments, the magnitude of the image estimate may be determined by the grey level or intensity of a plurality of pixels inside the image estimate.

In 1009, the current iteration times may be updated. For example, in each iteration, the current iteration times may be added by 1.

In 1010, whether the value of the objective function is smaller than the reference value of the objection function may be determined. If the value is smaller than the reference value, process 1000 may proceed to operation 1012. If the value of the objective function is equal to or greater than the reference value of the objection function, process 1000 may return to 1006.

In 1012, the value of the objective function determined in the current iteration may be designated as the reference value of the objection function. The reference value determined in 1004 may be updated based on the value of the objective function determined in 1008.

In 1014, whether a preset condition is satisfied may be determined. If the preset condition is satisfied, process 1000 may proceed to 1016. If the preset condition is unsatisfied, process 1000 may return to 1006. In some embodiments, the preset condition may be such that the change in the value of the objective function in the two or more consecutive iterations may be equal to or smaller than a threshold. For example, the preset condition may be satisfied when the differences between the values of the objective function corresponding to the image estimates in several consecutive iterations are below a threshold. Merely by way of example, the preset condition may be satisfied when (1) the difference between the value of the objective function corresponding to the image estimate $X^k$ and the value of the objective function corresponding to the image estimate $X^{k-1}$ is smaller than a threshold, and (2) the difference between the value of the objective function corresponding to the image estimate $X^{k-1}$ and the value of the objective function corresponding to the image estimate $X^{k-2}$ is also smaller than the threshold. The threshold may be part of default settings of the processing engine 120, or may be adjusted by a user (e.g., a doctor) under different situations. In some embodiments, the preset condition may be such that the current iteration times may be equal to or larger than a preset threshold. In some embodiments, if the current iteration times is equal to or larger than the preset threshold, the iteration may be terminated, and the process 1000 may proceed to 1016. In some embodiments, if the current iteration times is less than the preset threshold, the process 1000 may return to 1006, and a next iteration may be started.

In 1016, the image estimate may be determined as the target image. The target image may correspond to an optimal solution of the objective function.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 1002 and operation 1004 may be integrated into one single operation. As another example, operation 1002, operation 1004, operation 1008, operation 1010, and/or operation 1012 may be unnecessary and may be omitted. It may be indicated that the iteration process 1000 may terminate after a certain times of iterations are performed.

FIG. 11A is a diagram illustrating a modified Tam window weighting lines according to some embodiments of the present disclosure. As shown in FIG. 11A, the horizontal axis denotes a channel direction, and the vertical axis (also referred to as a Z axis) denotes a row direction. The range A1-A2 (i.e., the range between the lines A1 and A2 may define an original Tam window. The range A1-B1 (i.e., the range between the lines A1 and B1), the range A2-B2 (i.e., the range between the lines A2 and B2), the range B1-C1 (i.e., the range between the lines B1 and C1), and/or the range B2-C2 (i.e., the range between the lines B2 and C2) may represent an extended portion of the original Tam window. An extended Tam window (also referred to as a modified Tam window) may include the original Tam window and the extended portion of the original Tam window. The extended Tam window may be determined based on a weighting matrix as described in connection with FIG. 7. The detector units located in the range B1-B2 (i.e., the range between the line B1 and B2, also the combination of the range A1-A2, the range A1-B1, and the range A2-B2) may have weighting factors equal to 1 (see FIG. 11B). The detector units located in the range B1-C1 and/or the range B2-C2 may have weighting factors larger than 0 and less than 1 (see FIG. 11B). The detector units located in the residual ranges beyond the extended Tam window may have weighting factors equal to 0 (see FIG. 11B). The range B2-C2 may refer to the first range described in FIG. 7. The range B1-B2 may refer to the second range described in FIG. 7. The range B1-C1 may refer to the third range described in FIG. 7.

FIG. 11B is a diagram illustrating a weighting matrix according to some embodiments of the present disclosure. As shown in FIG. 11B, the horizontal axis denotes a channel direction, the left vertical axis (also referred to as a Z axis) denotes a row direction, and the right vertical bar denotes the values of weighting factors in the weighting matrix. The values of weighting factors may be determined based on Equation (3). The values of the weighting factors in the weighting matrix may be in a range from 0 to 1. A weighting factor in the weighting matrix may correspond to a detector unit in a detector array (e.g., the detector array 114). The expression of A1, A2, B1, B2, C1, and C2 may be similar as that in FIG. 11A.

FIG. 11C is a diagram illustrating a combination of a modified Tam window and a weighting matrix according to some embodiments of the present disclosure. As shown in FIG. 11C, the horizontal axis denotes a channel direction, the left vertical axis (also referred to as a Z axis) denotes a row direction, and the right vertical bar denotes the values of weighting factors in the weighting matrix. As described in FIG. 11A, the detectors located in the range A1-A2, the range A1-B1, and the range A2-B2 may have weighting factors equal to 1, while the detectors located in the range B1-C1 and the range B2-C2 may have weighting factors less than 1 and greater than 0.

It should be noted that the positions of the lines A1, A2, B1, B2, C1, and C2 are merely provided for the purposes of illustration, and not intended to limit the range of the original Tam window, the extended Tam window, and the values of the weighting factors. For persons having ordinary skills in the art, multiple variations and modifications may be made under the teachings of the present disclosure. However, those variations and modifications do not depart from the scope of the present disclosure.

Examples

The following examples are provided for illustration purposes, and are not intended to limit the scope of the present disclosure.

Figure 12A:
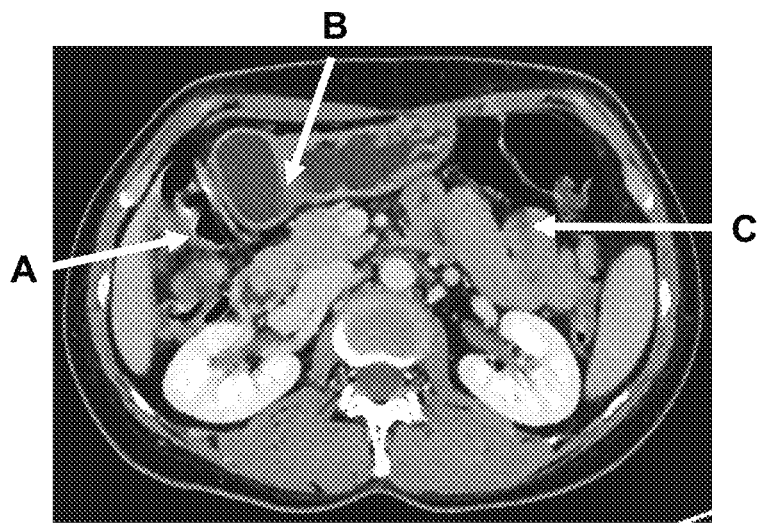
FIG. 12A is an exemplary image related to an intestine reconstructed based on raw data according to some embodiments of the present disclosure.

FIG. 12A is an exemplary image related to an intestine reconstructed based on raw data according to some embodiments of the present disclosure. The image related to the intestine was reconstructed by performing an iterative reconstruction technique based on the raw data (e.g., projection data) related to the intestine. Motion artifacts were present in the image in the regions indicated by the arrows A, B and C.

Figure 12B:
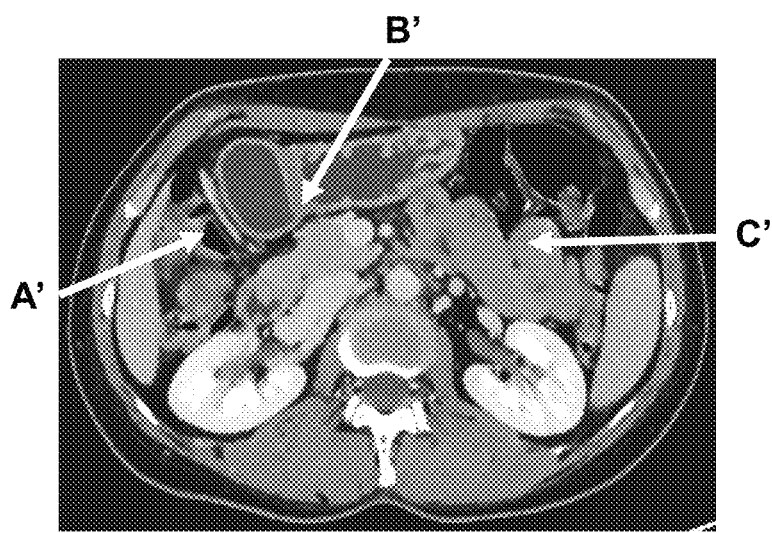
FIG. 12B is an exemplary image related to an intestine reconstructed based on a weighting matrix and the raw data applied in FIG. 12A according to some embodiments of the present disclosure.

FIG. 12B is an exemplary image related to an intestine reconstructed based on a weighting matrix and the raw data applied in FIG. 12A according to some embodiments of the present disclosure. The image related to the intestine was reconstructed by performing an iterative reconstruction technique based on a first set of data related to the intestine. The first set of data were determined by processing the raw data related to the intestine using the weighting matrix. Motion artifacts were reduced in the regions indicated by the arrows A', B' and C'.

Figure 13A:
FIG. 13A is an exemplary image related to lungs reconstructed based on raw data according to some embodiments of the present disclosure.

FIG. 13A is an exemplary image related to lungs reconstructed based on raw data according to some embodiments of the present disclosure. The image related to lungs was reconstructed by performing an iterative reconstruction technique based on the raw data (e.g., projection data) related to the lungs. Motion artifacts were present in the image in the regions indicated by the arrows A, B and C.

Figure 13B:
FIG. 13B is an exemplary image related to lungs reconstructed based on a weighting matrix and the raw data applied in FIG. 13A according to some embodiments of the present disclosure.
Figure 14A:
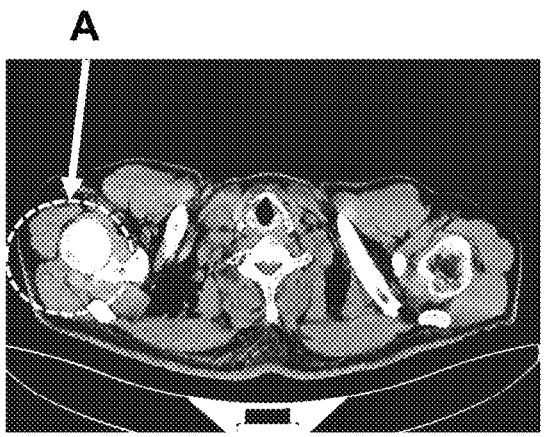
FIGS. 14A-14D are exemplary images reconstructed based on a weighting matrix and raw data according to some embodiments of the present disclosure.
Figure 14B:
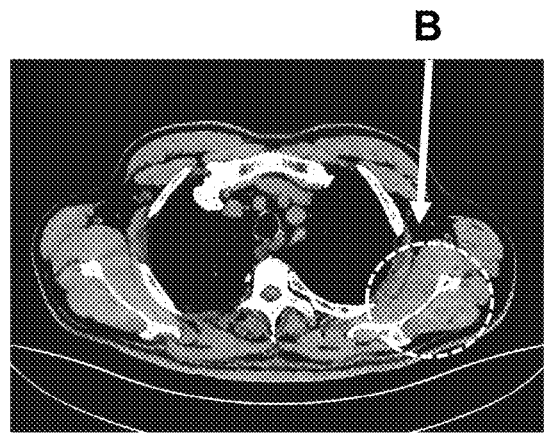
Figure 14C:
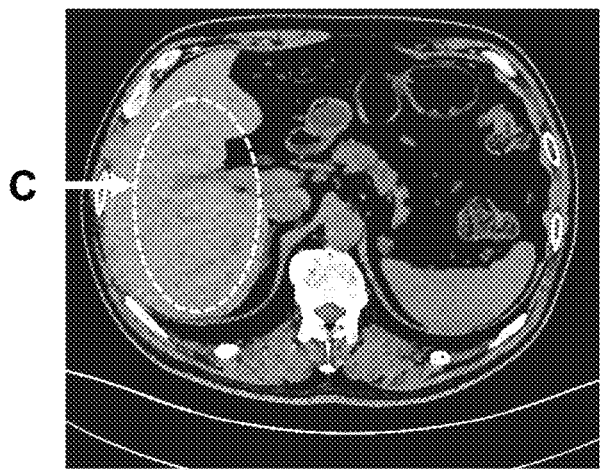
Figure 14D:
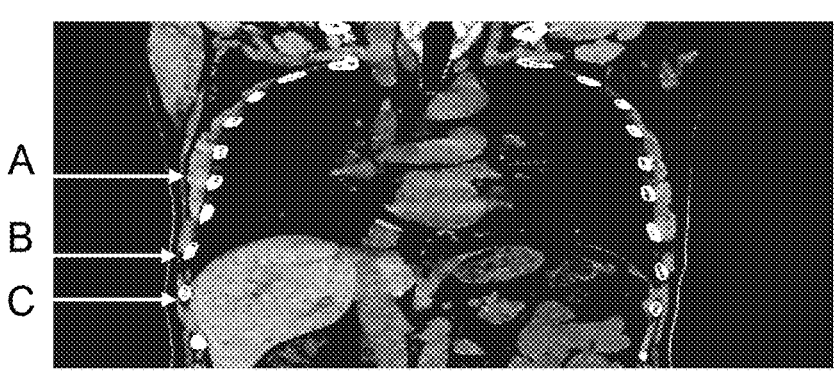

FIG. 13B is an exemplary image related to lungs reconstructed based on a weighting matrix and the raw data applied in FIG. 13A according to some embodiments of the present disclosure. The image related to the lungs was reconstructed by performing an iterative reconstruction technique based on a first set of data related to the lungs. The first set of data were determined by processing the raw data related to the lungs using the weighting matrix. Motion artifacts were reduced in the regions indicated by the arrows A', B' and C'.

FIGS. 14A-14D are exemplary image slices reconstructed based on a weighting matrix and raw data according to some embodiments of the present disclosure. As shown in FIGS. 14A-14D, noise appeared in different slices were distributed non-uniformly. For example, noises in the regions indicated by arrows A, B and C were higher than other regions of the images.

Figure 15A:
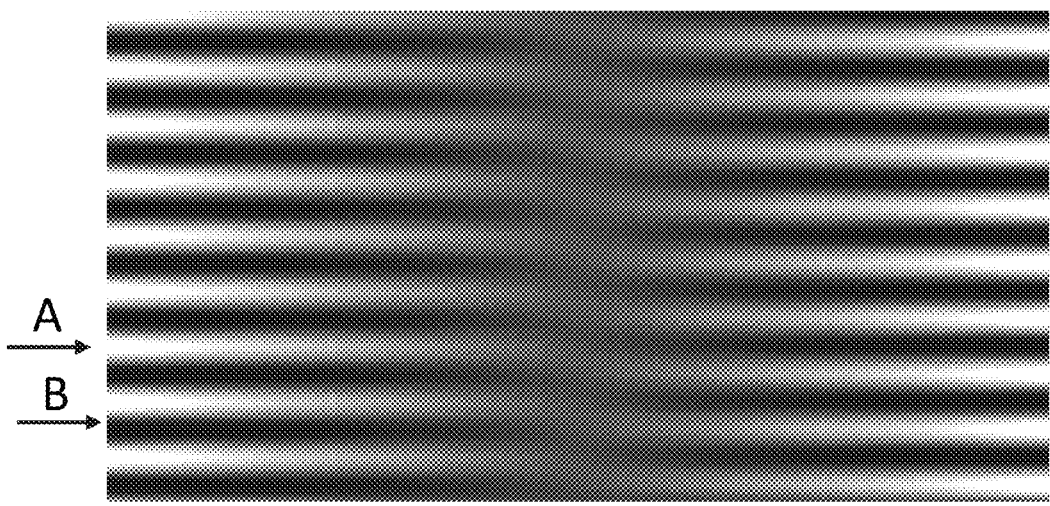
FIG. 15A is an exemplary image illustrating a second model relating to an intensity of regularization according to some embodiments of the present disclosure.

FIG. 15A is an exemplary image illustrating a second model relating to an intensity of regularization according to some embodiments of the present disclosure. The second model includes a plurality of elements corresponding to pixels in the image. Each of the plurality of elements corresponds to a pixel in the image. The value of an element was denoted by a gray value of the corresponding pixel in the image. The pixels in the regions with relatively large gray values, for example, indicated by arrow A, correspond to elements with relatively large values in the second model. The pixels in the regions with relatively small gray values, for example, indicated by arrow B, correspond to elements with relatively small values in the second model.

Figure 15B:
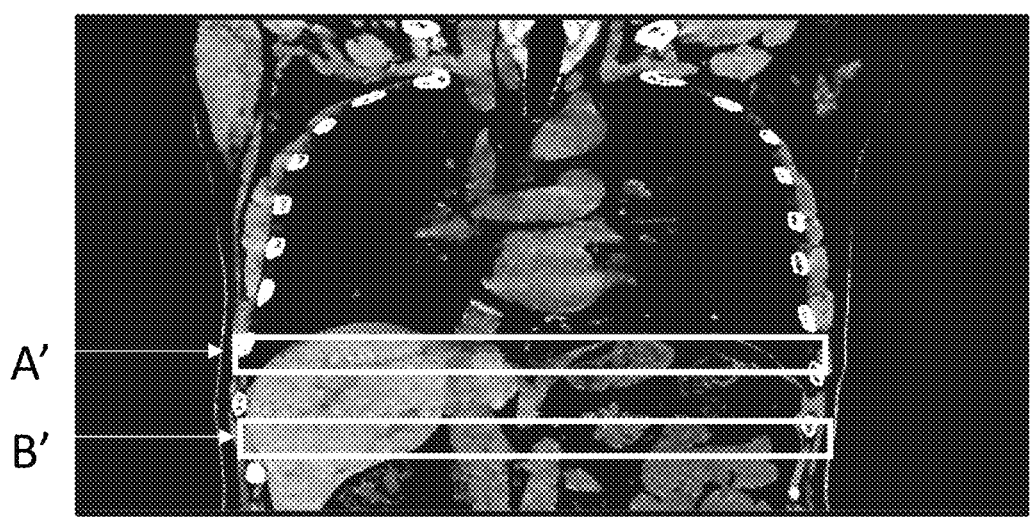
FIG. 15B is an exemplary image reconstructed based on a weighting matrix and raw data according to some embodiments of the present disclosure.

FIG. 15B is an exemplary image reconstructed based on a weighting matrix and raw data according to some embodiments of the present disclosure. The region A' indicated by arrow A' has a relatively high noise level than the region B' indicated by arrow B'. The region A' corresponds to elements with relatively large values in the second model, for example, indicated by arrow A in FIG. 15A.

Figure 16A:
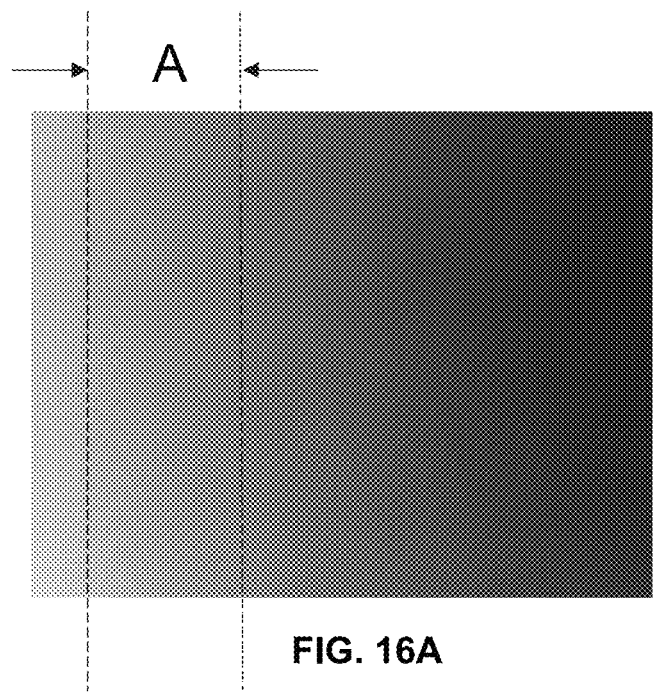
FIG. 16A is an exemplary image illustrating a second model relating to an intensity of regularization according to some embodiments of the present disclosure.

FIG. 16A is an exemplary image illustrating a second model relating to an intensity of regularization according to some embodiments of the present disclosure. The pixels in the region A indicated by arrow A have relatively large gray values. The region A corresponds to elements with relatively large values in the second model.

Figure 16B:
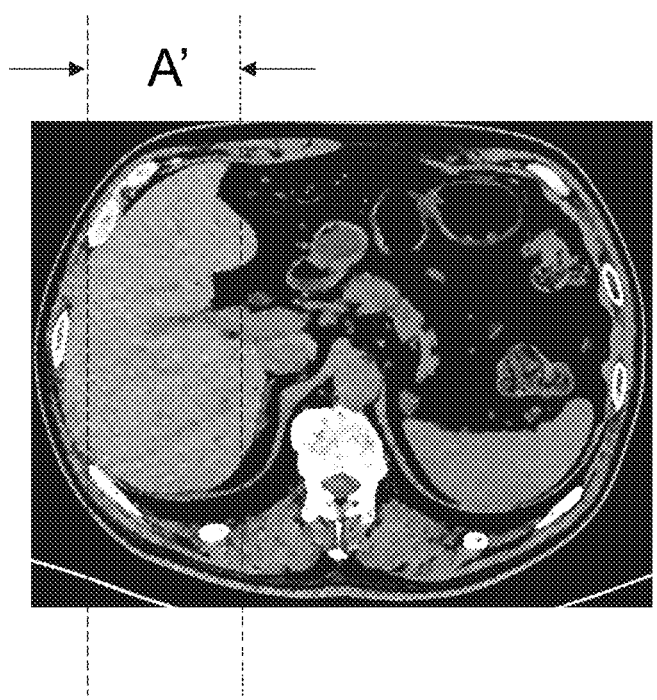
FIG. 16B is an exemplary image reconstructed based on a weighting matrix and raw data according to some embodiments of the present disclosure.

FIG. 16B is an exemplary image reconstructed based on a weighting matrix and raw data according to some embodiments of the present disclosure. The pixels in the region A' indicated by arrow A' have a relatively high noise level. The region A' corresponds to elements with relatively large values in the second model, for example, indicated by arrow A in FIG. 16A.

Figure 17A:
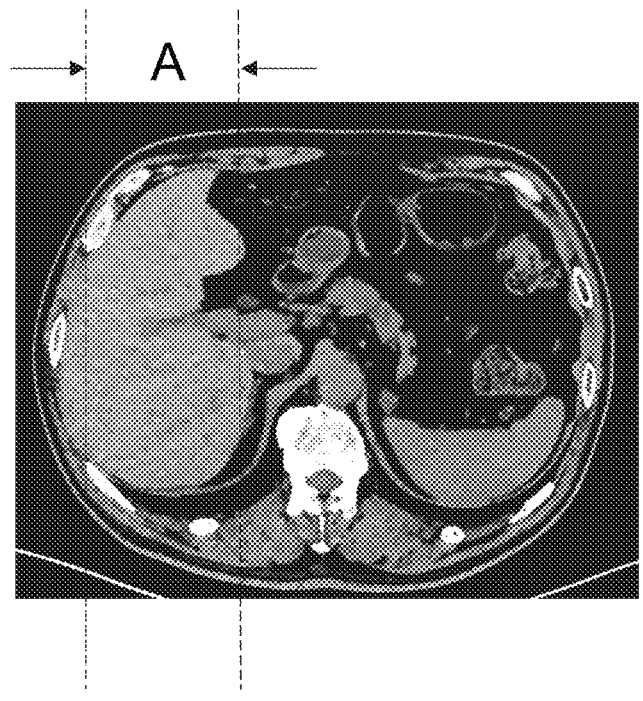
FIG. 17A is an exemplary image reconstructed based on a weighting matrix and raw data according to some embodiments of the present disclosure.

FIG. 17A is an exemplary image reconstructed based on a weighting matrix and raw data according to some embodiments of the present disclosure. The image shows non-uniformly distributed noise. For example, the region A indicated by arrow A has a relatively high noise level.

Figure 17B:
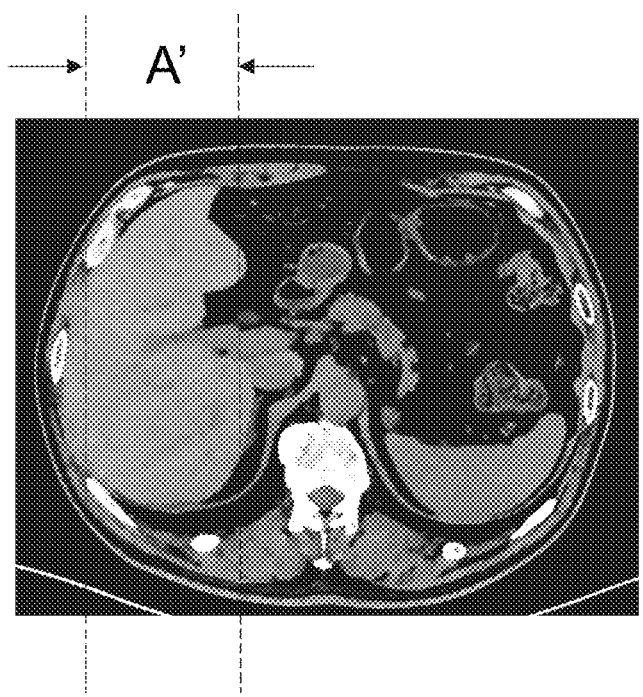
FIG. 17B is an exemplary image reconstructed based on a weighting matrix, raw data, and a second model related to an intensity of regularization according to some embodiments of the present disclosure.

FIG. 17B is an exemplary image reconstructed based on a weighting matrix, raw data, and a second model related to an intensity of regularization according to some embodiments of the present disclosure. The image shows uniformly distributed and reduced noise. As shown, the noise in the region A' indicated by arrow A' is reduced and distributes more uniformly in comparison with the region A in FIG. 17A.

Figure 18A:
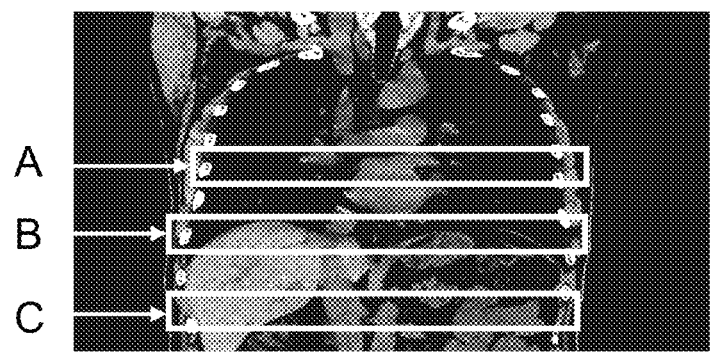
FIG. 18A is an exemplary image reconstructed based on a weighting matrix and raw data according to some embodiments of the present disclosure.

FIG. 18A is an exemplary image reconstructed based on a weighting matrix and raw data according to some embodiments of the present disclosure. The image shows non-uniformly distributed noise. The region A indicated by arrow A, the region B indicated by arrow B, and the region C indicated by arrow C illustrate relatively high noise levels.

Figure 18B:
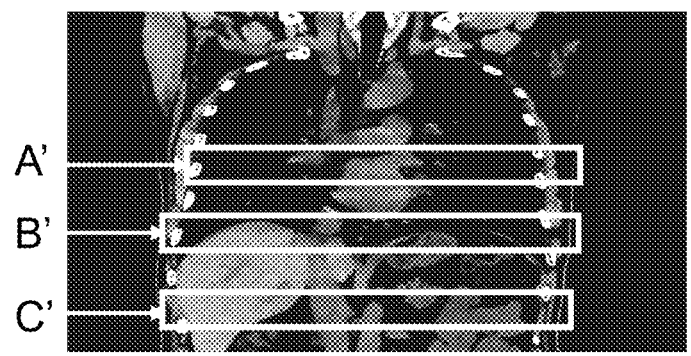
FIG. 18B is an exemplary image reconstructed based on a weighting matrix, raw data, and a second model relating to an intensity of regularization according to some embodiments of the present disclosure.

FIG. 18B is an exemplary image reconstructed based on a weighting matrix, raw data, and a second model relating to an intensity of regularization according to some embodiments of the present disclosure. As shown, the noise in the region A' indicated by arrow A', the region B' indicated by arrow B', and the region C' indicated by arrow C' is reduced and distributes more uniformly in comparison with the region A, the region B, and the region C in FIG. 18A.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A method implemented on a computing device having at least one processor, at least one computer-readable storage medium, and a communication port connected to an imaging device, the method comprising:
    obtaining image data, wherein the image data includes projection data and is generated by the imaging device;
    determining an objective function associated with a target image based on the image data, the objective function including a regularization item for denoising the image data, the regularization item including a second model for adjusting an intensity of denoising the image data, wherein the second model is determined based on a weighting matrix, and the weighting matrix is determined based on an extended Tam window; and
    reconstructing the target image by performing a plurality of iterations based on the objective function.

2. The method of claim 1, wherein the second model relates to an intensity of denoising an image estimate generated in at least one of the plurality of iterations.

3. The method of claim 1, wherein the second model is determined based further on a square of a back-projection of the image data weighted by the weighting matrix.

4. The method of claim 1, wherein the extended Tam window is determined by extending a range of a Tam window.

5. The method of claim 1, wherein the weighting matrix relates to the image data and includes a plurality of weighting factors that are within a range from 0 to 1.

6. The method of claim 5, wherein:
    the imaging device includes a detector array, the detector array includes a plurality of rows of detector units, the detector units are arranged in a row direction and a channel direction; and
    the method further includes determining the plurality of weighting factors of the weighting matrix based on at least one parameter relating to the detector array, the at least one parameter including a position of at least one detector unit that detects the image data in the row direction.

7. The method of claim 6, wherein the determining the plurality of weighting factors of the weighting matrix includes:
    applying a first parameter and a second parameter to determine or adjust the plurality of weighting factors, the first parameter defining a first range of a position of a detector unit in the row direction corresponding to a first set of weighting factors that are equal to 1, and the second parameter defining a second range of a position of a detector unit in the row direction corresponding to a second set of weighting factors that are less than 1.

8. The method of claim 1, wherein the determining an objective function associated with a target image based on the image data includes:
    determining a weighting window based on parameters relating to the detector array, the weighting window corresponding to the extended Tam window;
    determining a first set of data based on the image data and the weighting window; and
    determining the objective function associated with the target image based on the first set of data.

9. The method of claim 8, wherein the objective function further includes a first model representing a difference between a projection of the target image and the first set of data, and the first model is identified based on the first set of data.

10. The method of claim 9, wherein the objective function is a sum of the first model and the regularization item.

11. The method of claim 8, wherein the determining a first set of data based on the image data and the weighting window includes:
    determining the first set of data based on a dot product between a matrix of the image data and the weighting window, wherein the matrix of the image data includes a plurality of subsets of image data.

12. The method of claim 8, wherein the determining a first set of data based on the image data and the weighting window includes:
    determining the first set of data based further on the weighting matrix.

13. The method of claim 8, wherein the parameters relating to the detector array include at least one of a first count of the detector units in the row direction, a second count of the detector units in the channel direction, a pitch, or an angle of one of the detector units with respect to the channel direction.

14. The method of claim 1, wherein the method further includes:
    determining a constraint associated with the objective function for determining a target value of the objective function, wherein the target value corresponds to the target image.

15. The method of claim 1, wherein the method further includes:
    pre-processing the image data, wherein the pre-processing the image data includes denoising the image data based on a third model, the third model being generated based on a noise statistical model.

16. A system, comprising:
    at least one non-transitory computer-readable storage medium including a set of instructions;
    at least one processor in communication with the at least one non-transitory computer-readable storage medium, wherein when executing the instructions, the at least one processor is configured to cause the system to:
    obtain image data, wherein the image data includes projection data and is generated by the imaging device;
    determine an objective function associated with a target image based on the image data, the objective function including a regularization item for denoising the image data, the regularization item including a second model for adjusting an intensity of denoising the image data, wherein the second model is determined based on a weighting matrix, and the weighting matrix is determined based on an extended Tam window; and
    reconstruct the target image by performing a plurality of iterations based on the objective function.

17. The system of claim 16, wherein to determine an objective function associated with a target image based on the image data, the at least one processor is further configured to cause the system to:
    determine a weighting window based on parameters relating to the detector array, the weighting window corresponding to the extended Tam window;
    determine a first set of data based on the image data and the weighting window; and
    determine the objective function associated with the target image based on the first set of data.

18. The method of claim 17, wherein the objective function further includes a first model representing a difference between a projection of the target image and the first set of data, the first model is identified based on the first set of data, and the objective function is a sum of the first model and the regularization item.

19. The method of claim 17, wherein the determining a first set of data based on the image data and the weighting window includes:
   determining the first set of data based on a dot product between a matrix of the image data and the weighting window, wherein the matrix of the image data includes a plurality of subsets of image data.

20. A non-transitory computer readable medium embodying a computer program product, the computer program product comprising instructions configured to cause a computing device to:
   obtain image data, wherein the image data includes projection data and is generated by the imaging device;
   determine an objective function associated with a target image based on the image data, the objective function including a regularization item for denoising the image data, the regularization item including a second model for adjusting an intensity of denoising the image data, wherein the second model is determined based on a weighting matrix, and the weighting matrix is determined based on an extended Tam window; and
   reconstruct the target image by performing a plurality of iterations based on the objective function.

\* \* \* \* \*